United States Patent
Hinton

(10) Patent No.: US 7,657,639 B2
(45) Date of Patent: Feb. 2, 2010

(54) METHOD AND SYSTEM FOR IDENTITY PROVIDER MIGRATION USING FEDERATED SINGLE-SIGN-ON OPERATION

(75) Inventor: Heather M. Hinton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 11/459,118

(22) Filed: Jul. 21, 2006

(65) Prior Publication Data
US 2008/0021997 A1    Jan. 24, 2008

(51) Int. Cl.
G06F 15/16   (2006.01)
(52) U.S. Cl. .................... 709/229; 726/8; 709/227
(58) Field of Classification Search .......... 709/225, 709/229, 227; 726/8
See application file for complete search history.

(56) References Cited

U.S. PATENT DOCUMENTS

| | | | |
|---|---|---|---|
| 6,609,198 B1 * | 8/2003 | Wood et al. | 713/155 |
| 7,296,290 B2 * | 11/2007 | Barriga et al. | 726/8 |
| 2003/0149781 A1 * | 8/2003 | Yared et al. | 709/229 |
| 2005/0289341 A1 * | 12/2005 | Ritola et al. | 713/168 |

* cited by examiner

*Primary Examiner*—Ario Etienne
*Assistant Examiner*—Andrew Georgandellis
(74) *Attorney, Agent, or Firm*—Jeffrey S. LaBaw; David H. Judson

(57) ABSTRACT

A method is presented for performing an identity provider migration operation with respect to a user within a federated computational environment, wherein the user has a first user account at a first identity provider, a second user account at a second identity provider, and a third user account at a service provider. A request to access a resource is received by the service provider, after which a federated single-sign-on operation for the user is performed between the service provider and the first identity provider. Prior to sending a response to the request to access the protected resource, information in the third user account is modified to indicate that the service provider relies upon the second identity provider to authenticate the user on behalf of the service provider rather than the first identity provider. A response for the request to access the resource is then returned by the service provider.

45 Claims, 10 Drawing Sheets

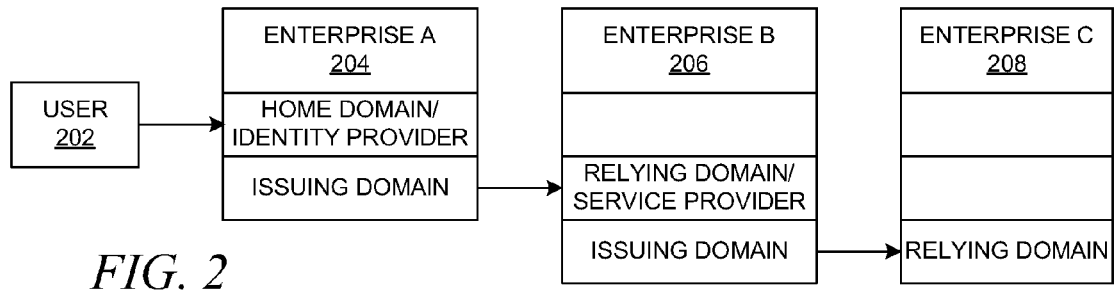
FIG. 2
FIG. 3
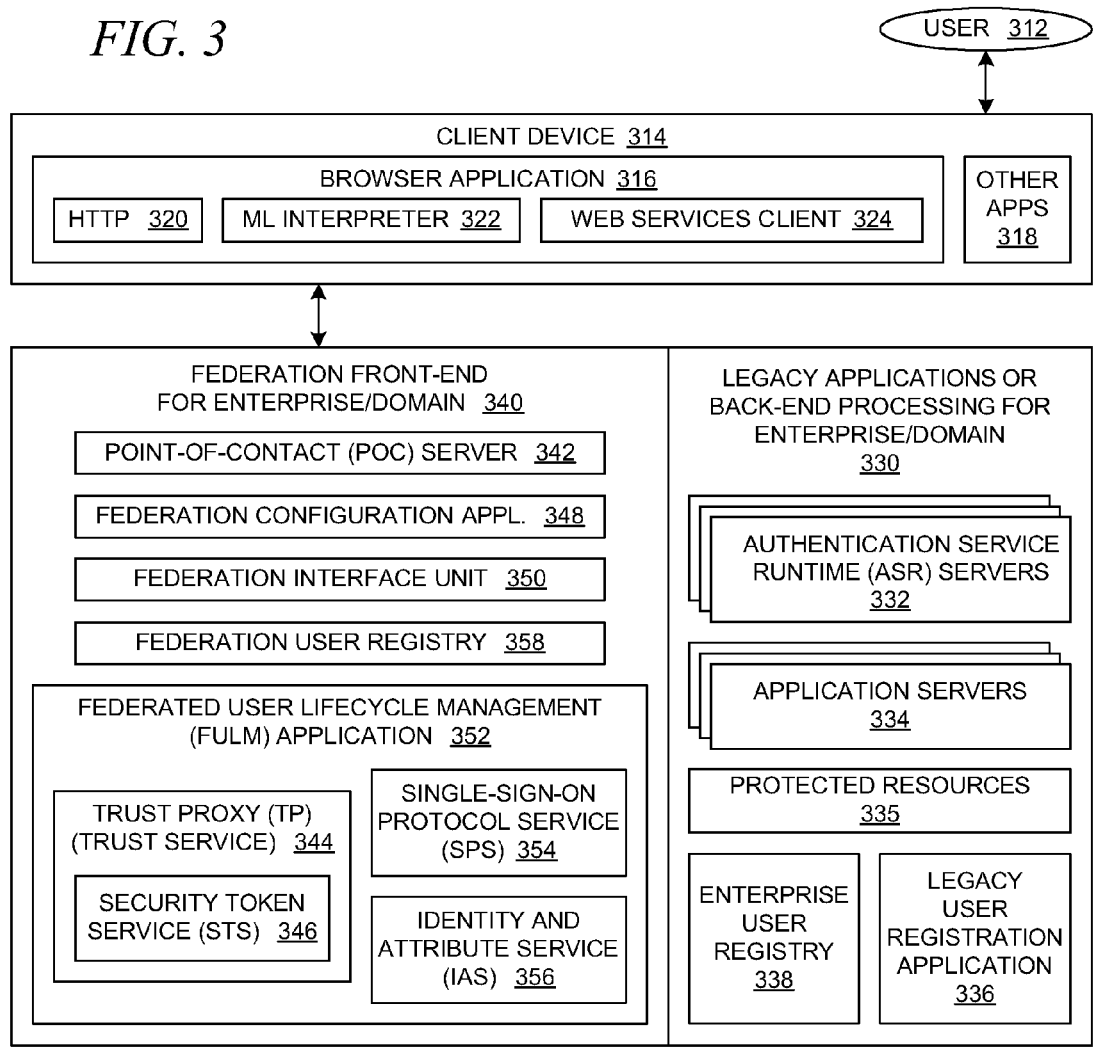

METHOD AND SYSTEM FOR IDENTITY PROVIDER MIGRATION USING FEDERATED SINGLE-SIGN-ON OPERATION

BACKGROUND OF THE INVENTION

1. Field of the Invention

The present invention relates to an improved data processing system and, in particular, to a method and apparatus for multicomputer data transferring. Still more particularly, the present invention is directed to networked computer systems.

2. Description of Related Art

To reduce the costs of user management and to improve interoperability among enterprises, federated computing spaces have been created. A federation is a loosely coupled affiliation of enterprises which adhere to certain standards of interoperability; the federation provides a mechanism for trust among those enterprises with respect to certain computational operations for the users within the federation. For example, a federation partner may act as a user's home domain or identity provider. Other partners within the same federation may rely on the user's identity provider for primary management of the user's authentication credentials, e.g., accepting a single-sign-on token that is provided by the user's identity provider.

As enterprises move to support federated business interactions, these enterprises should provide a user experience that reflects the increased cooperation between two businesses and minimizes the operational burdens of a user. Within these federations, these enterprises have begun to interoperate to support a variety of federation protocols of which a user may be unaware or may be only minimally aware. For example, federated enterprises may perform various types of operations for user account management, such as managing a user-specific alias identifier, that might require minimal interaction with the user to complete an operation. The federated enterprises should cooperate to an extent that the user is not confused or overburdened with knowledge of the underlying mechanism by which such types of operations are coordinated.

For example, a user may authenticate to one party that acts as an identity provider and then single-sign-on to a federated business partner that acts as a service provider. In conjunction with this single-sign-on functionality, additional user lifecycle functionality, such as account linking/de-linking and single-sign-off, should also be supported, particularly in a manner such that this federated user lifecycle management (FULM) functionality is not burdensome to either party.

However, current federated user lifecycle management functionality does not accommodate the types of lifecycle functionality that may be required by the advanced interactions of many enterprises. For example, the FTN profile within the Liberty Alliance specifications accomplishes an account delinking operation by simply breaking the link between an identity provider and a service provider. This type of solution does not allow for a "loosely coupled" environment with ease for migrating user relationships between partners within a federation.

Therefore, it would be advantageous to implement a federated enterprise and its computational infrastructure such that it allows for software-enabled establishment of federation relationships between federation partners along with the management of those federation relationships.

SUMMARY OF THE INVENTION

A method, an apparatus, and a computer program product are presented for performing an identity provider migration operation with respect to a user within a federated computational environment that includes a first identity provider, a second identity provider, and a service provider. A first user account for a user is managed at a first identity provider; a second user account for the user is managed at a second identity provider; and a third user account for the user is managed at a service provider. A request by the user to access a protected resource that is managed by the service provider is received by the service provider, after which a federated single-sign-on operation for the user is performed between the service provider and the first identity provider. Prior to sending a response to the request to access the protected resource, information in the third user account is modified to indicate that the service provider relies upon the second identity provider to authenticate the user on behalf of the service provider rather than the first identity provider. A response for the request to access the protected resource is then returned by the service provider.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 2 depicts a block diagram that illustrates the terminology of the federated environment with respect to a transaction that is initiated by a user to a first federated enterprise, which, in response, invokes actions at downstream entities within the federated environment;

FIG. 3 depicts a block diagram that illustrates the integration of pre-existing data processing systems at a given domain with some federated architecture components for supporting an embodiment of the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
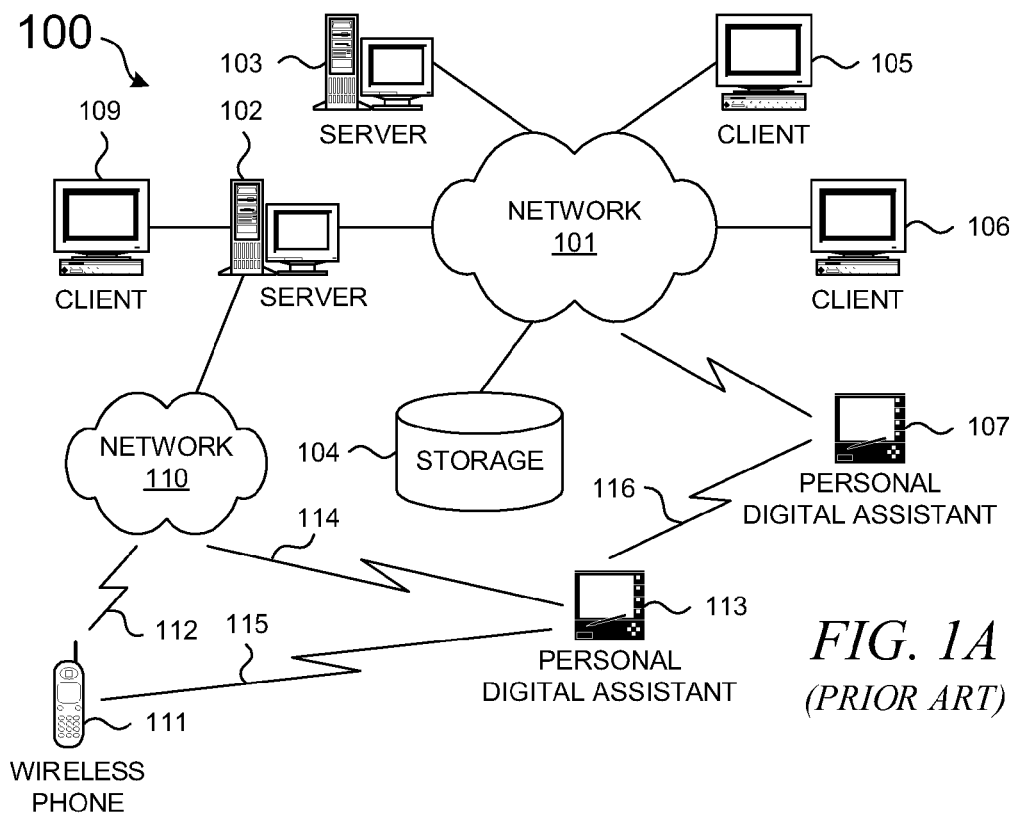
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. PDA 113 can transfer data to PDA 107 via wireless communication link 116.

The present invention could be implemented on a variety of hardware platforms and software environments. FIG. 1A is intended as an example of a heterogeneous computing environment and not as a limitation on the present invention.

Figure 1B:
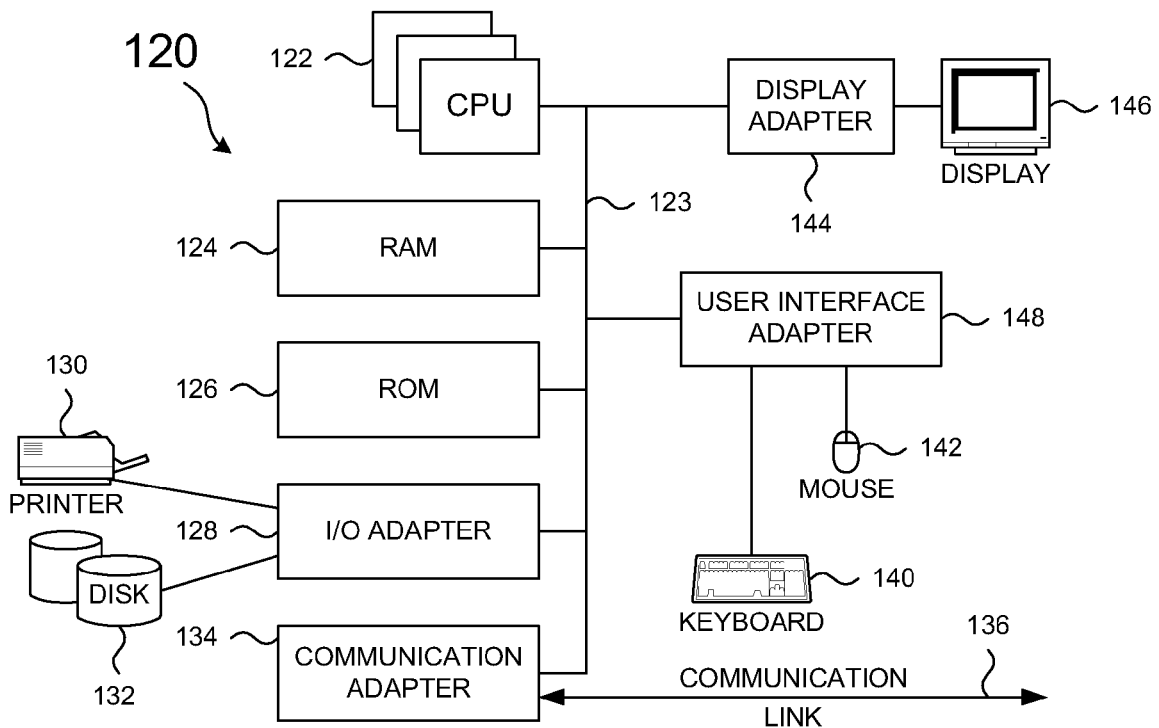
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices, such as a audio output system, etc. System bus 123 also connects comm. adapter 134 that provides access to comm. link 136. User interface adapter 148 connects user devices, such as keyboard 140 and mouse 142, or other devices, such as a touch screen, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply limitations on the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Given the preceding brief description of some current technology, the description of the remaining figures relates to federated computer environments in which the present invention may operate. Prior to discussing the present invention in more detail, however, some terminology is introduced.

Terminology

The terms "entity" or "party" generally refers to an organization, an individual, or a system that operates on behalf of an organization, an individual, or another system. The term "domain" connotes additional characteristics within a network environment, but the terms "entity", "party", and "domain" can be used interchangeably. For example, the term "domain" may also refer to a DNS (Domain Name System) domain, or more generally, to a data processing system that includes various devices and applications that appear as a logical unit to exterior entities.

The terms "request" and "response" should be understood to comprise data formatting that is appropriate for the transfer of information that is involved in a particular operation, such as messages, communication protocol information, or other associated information. A protected resource is a resource (an application, an object, a document, a page, a file, executable code, or other computational resource, communication-type resource, etc.) for which access is controlled or restricted.

A token provides direct evidence of a successful operation and is produced by the entity that performs the operation, e.g., an authentication token that is generated after a successful authentication operation. A Kerberos token is one example of an authentication token that may be used with the present invention. More information on Kerberos may be found in Kohl et al., "The Kerberos Network Authentication Service (V5)", Internet Engineering Task Force (IETF) Request for Comments (RFC) 1510, September 1993.

An assertion provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service.

A Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes. As discussed further below, assertion formats can be translated to other assertion formats when necessary.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically but not necessarily a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, etc. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Federation Model for Computing Environment that may Incorporate the Present Invention In the context of the World Wide Web, users are coming to expect the ability to jump from interacting with an application on one Internet domain to another application on another domain with minimal regard to the information barriers between each particular domain. Users do not want the frustration that is caused by having to authenticate to multiple domains for a single transaction. In other words, users expect that organizations should interoperate, but users generally want domains to respect their privacy. In addition, users may prefer to limit the domains that permanently store private information. These user expectations exist in a rapidly evolving heterogeneous environment in which many enterprises and organizations are promulgating competing authentication techniques.

The present invention is supported within a federation model that allows enterprises to provide a single-sign-on experience to a user. In other words, the present invention may be implemented within a federated, heterogeneous environment. As an example of a transaction that would benefit from a federated, heterogeneous environment, a user is able to authenticate to a domain and then have the domain provide the appropriate assertions to each downstream domain that might be involved in a transaction. These downstream domains need to be able to understand and trust authentication assertions and/or other types of assertions, even though there are no pre-established assertion formats between the domain and these other downstream domains. In addition to recognizing the assertions, the downstream domains need to be able to translate the identity contained within an assertion to an identity that represents the user within a particular domain, even though there is no pre-established identity mapping relationship.

The present invention is supported within a federated environment. In general, an enterprise has its own user registry and maintains relationships with its own set of users. Each enterprise typically has its own means of authenticating these users. However, the federated scheme for use with the present invention allows enterprises to cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

In the context of the present invention, a federation is a set of distinct entities, such as enterprises, logical units within an enterprise, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions, e.g., authentication tokens, that are presented by other entities, and providing some form of translation of the identity of the vouched-for user into one that is understood within the local entity.

Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider.

The system that supports the present invention also concerns a federated identity management system that establishes a foundation in which loosely coupled authentication, user enrollment, user profile management and/or authorization services collaborate across security domains. Federated identity management allows services residing in disparate security domains to securely interoperate and collaborate even though there may be differences in the underlying security mechanisms and operating system platforms at these disparate domains.

Identity Provider vs. Service Provider

As mentioned above and as explained in more detail further below, a federated environment provides significant user benefits. A federated environment allows a user to authenticate at a first entity, which may act as an issuing party to issue an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user. Furthermore, this information can be used by a relying party to provide access to the relying party's resources, based on the relying party's access control rules, identity mapping rules, and possibly some user attributes that are maintained by the relying party.

With reference now to FIG. 2, a block diagram depicts the terminology of the federated environment with respect to a transaction that is initiated by a user to a first federated enterprise, which, in response, invokes actions at downstream entities within the federated environment. FIG. 2 shows that the terminology may differ depending on the perspective of an entity within the federation for a given federated operation. More specifically, FIG. 2 illustrates that a computing environment that supports the present invention supports the transitivity of trust and the transitivity of the authentication assertion process; a domain or an entity can issue an assertion based on its trust in an identity as asserted by another domain or another entity.

User 202 initiates a transaction through a request for a protected resource at enterprise 204. If user 202 has been authenticated by enterprise 204 or will eventually be authenticated by enterprise 204 during the course of a transaction, then enterprise 204 may be termed the user's home domain for this federated session. Assuming that the transaction requires some type of operation by enterprise 206 and enterprise 204 transfers an assertion to enterprise 206, then enterprise 204 is the issuing entity with respect to the particular operation, and enterprise 206 is the relying entity for the operation.

The issuing entity issues an assertion for use by the relying domain; an issuing entity is usually, but not necessarily, the user's home domain or the user's identity provider. Hence, it would usually be the case that the issuing party has authenticated the user using a typical authentication operation. However, it is possible that the issuing party has previously acted as a relying party whereby it received an assertion from a different issuing party. In other words, since a user-initiated transaction may cascade through a series of enterprises within a federated environment, a receiving party may subsequently act as an issuing party for a downstream transaction. In general, any entity that has the ability to issue authentication assertions on behalf of a user can act as an issuing entity.

The relying entity is an entity that receives an assertion from an issuing entity. The relying party is able to accept, trust, and understand an assertion that is issued by a third party on behalf of the user, i.e. the issuing entity; it is generally the relying entity's duty to use an appropriate authentication authority to interpret an authentication assertion. A relying party is an entity that relies on an assertion that is presented on behalf of a user or another entity. In this manner, a user can be given a single-sign-on experience at the relying entity instead of requiring the relying entity to prompt the user for the user's authentication credentials as part of an interactive session with the user.

Referring again to FIG. 2, assuming that the transaction requires further operations such that enterprise 206 transfers an assertion to enterprise 208, then enterprise 206 is an upstream entity that acts as the issuing entity with respect to the subsequent or secondary transaction operation, and enterprise 208 is a downstream entity that acts as the relying entity for the operation; in this case, enterprise 208 may be regarded as another downstream entity with respect to the original transaction, although the subsequent transaction can also be described with respect to only two entities.

As shown in FIG. 2, a federated entity may act as a user's home domain, which provides identity information and attribute information about federated users. An entity within a federated computing environment that provides identity information, identity or authentication assertions, or identity services may be termed an identity provider. Other entities or federation partners within the same federation may rely on an identity provider for primary management of a user's authentication credentials, e.g., accepting a single-sign-on token that is provided by the user's identity provider; a domain at which the user authenticates may be termed the user's (authentication) home domain. The identity provider may be physically supported by the user's employer, the user's ISP, or some other commercial entity.

An identity provider is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

In some circumstances, there may be multiple entities within a federated environment that may act as identity providers for a user. For example, the user may have accounts at multiple federated domains, each of which is able to act as an identity provider for the user; these domains do not necessarily have information about the other domains nor about a user's identity at a different domain.

Although it may be possible that there could be multiple enterprises within a federated environment that may act as identity providers, e.g., because there may be multiple enterprises that have the ability to generate and validate a user's authentication credentials, etc., a federated transaction usually involves only a single identity provider. If there is only a single federated entity that is able to authenticate a user, e.g., because there is one and only one entity within the federation with which the user has performed a federated enrollment or registration operation, then it would be expected that this entity would act as the user's identity provider in order to support the user's transactions throughout the federated environment.

Within some federated transactions that require the interoperation of multiple service providers, a downstream service provider may accept an assertion from an upstream service provider; the conditions in which an upstream service provider may act as an issuing entity to a downstream service provider that is acting as a relying party may depend upon the type of trust relationship between the service providers and the type of transaction between the service providers. Within the scope of a simple federated transaction, however, there is only one entity that acts as an issuing entity.

The present invention may be supported within a given computing environment in which a federated infrastructure can be added to existing systems while minimizing the impact on an existing, non-federated architecture. Hence, operations, including authentication operations, at any given enterprise or service provider are not necessarily altered by the fact that an entity may also participate within a federated environment. In other words, even though an entity's computing systems may be integrated into a federated environment, a user may be able to continue to perform various operations, including authentication operations, directly with an enterprise in a non-federated manner. However, the user may be able to have the same end-user experience while performing a federated operation with respect to a given entity as if the user had performed a similar operation with the given entity in a non-federated manner. Hence, it should be noted that not all of a given enterprise's users necessarily participate federated transactions when the given enterprise participates in a federation; some of the enterprise's users may interact with the enterprise's computing systems without performing any federated transactions.

Moreover, user registration within the computing environment of a given enterprise, e.g., establishment of a user account in a computer system, is not necessarily altered by the fact that the enterprise may also participate within a federated environment. For example, a user may still establish an account at a domain through a legacy or pre-existing registration process that is independent of a federated environment. Hence, in some cases, the establishment of a user account at an enterprise may or may not include the establishment of account information that is valid across a federation when the enterprise participates within a federated computing environment.

Federated Architecture—Federation Front-End for Legacy Systems

With reference now to FIG. 3, a block diagram depicts the integration of pre-existing data processing systems at a given domain with some federated architecture components that may be used to support an embodiment of the present invention. A federated environment includes federated entities that provide a variety of services for users. User 312 interacts with client device 314, which may support browser application 316 and various other client applications 318. User 312 is distinct from client device 314, browser 316, or any other software that acts as interface between user and other devices and services. In some cases, the following description may make a distinction between the user acting explicitly within a client application and a client application that is acting on behalf of the user. In general, though, a requester is an intermediary, such as a client-based application, browser, SOAP client, etc., that may be assumed to act on behalf of the user.

Browser application 316 may be a typical browser, including those found on mobile devices, that comprises many modules, such as HTTP communication component 320 and markup language (ML) interpreter 322. Browser application 316 may also support plug-ins, such as web services client 324, and/or downloadable applets, which may or may not require a virtual machine runtime environment. Web services client 324 may use Simple Object Access Protocol (SOAP), which is a lightweight protocol for defining the exchange of structured and typed information in a decentralized, distributed environment. SOAP is an XML-based protocol that consists of three parts: an envelope that defines a framework for describing what is in a message and how to process it; a set of encoding rules for expressing instances of application-defined datatypes; and a convention for representing remote procedure calls and responses. User 312 may access web-based services using browser application 316, but user 312 may also access web services through other web service clients on client device 314. Some of the federated operations may employ HTTP redirection via the user's browser to exchange information between entities in a federated environment. However, it should be noted that the present invention may be supported over a variety of communication protocols and is not meant to be limited to HTTP-based communications. For example, the entities in the federated environment may communicate directly when necessary; messages are not required to be redirected through the user's browser.

The present invention may be supported in a manner such that components that are required for a federated environment can be integrated with pre-existing systems. FIG. 3 depicts one embodiment for implementing these components as a front-end to a pre-existing system. The pre-existing components at a federated domain can be considered as legacy applications or back-end processing components 330, which include authentication service runtime (ASR) servers 332 in a manner similar to that shown in FIG. 4. ASR servers 332 are responsible for authenticating users when the domain controls access to application servers 334, which can be considered to generate, retrieve, or otherwise support or process protected resources 335. The domain may continue to use legacy user registration application 336 to register users for access to application servers 334. Information that is needed to authenticate a registered user with respect to legacy operations is stored in enterprise user registry 338; enterprise user registry 338 may be accessible to federation components as well.

After joining a federated environment, the domain may continue to operate without the intervention of federated components. In other words, the domain may be configured so that users may continue to access particular application servers or other protected resources directly without going through a point-of-contact server or other component implementing this point-of-contact server functionality; a user that accesses a system in this manner would experience typical authentication flows and typical access. In doing so, however, a user that directly accesses the legacy system would not be able to establish a federated session that is known to the domain's point-of-contact server.

The domain's legacy functionality can be integrated into a federated environment through the use of federation front-end processing 340, which includes point-of-contact server 342 and trust proxy server 344 (or more simply, trust proxy 344 or trust service 344) which itself interacts with Security Token Service (STS) 346, which are described in more detail below with respect to FIG. 4. Federation configuration application 348 allows an administrative user to configure the federation front-end components to allow them to interface with the legacy back-end components through federation interface unit 350. Federated functionality may be implemented in distinct system components or modules. In a preferred embodiment, most of the functionality for performing federation operations may be implemented by a collection of logical components within a single federation application; federated user lifecycle management application 352 includes trust service 344 along with single-sign-on protocol service (SPS) 354. Trust service 344 may comprise identity-and-attribute service (IAS) 356, which is responsible for identity mapping operations, attribute retrieval, etc., as part of federation functionality. Identity-and-attribute service 356 may also be employed by single-sign-on protocol service 354 during single-sign-on operations. A federation user registry 358 may be employed in certain circumstances to maintain user-related information for federation-specific purposes.

Legacy or pre-existing authentication services at a given enterprise may use various, well known, authentication methods or tokens, such as username/password or smart card token-based information. However, in a preferred federated computing system for supporting the present invention, the functionality of a legacy authentication service can be used in a federated environment through the use of point-of-contact servers. Users may continue to access a legacy authentication server directly without going through a point-of-contact server, although a user that accesses a system in this manner would experience typical authentication flows and typical access; a user that directly accesses a legacy authentication system would not be able to generate a federated authentication assertion as proof of identity in accordance with the present invention. One of the roles of the federation front-end is to translate a federated authentication token received at a point-of-contact server into a format understood by a legacy authentication service. Hence, a user accessing the federated environment via the point-of-contact server would not necessarily be required to re-authenticate to the legacy authentication service. Preferably, the user would be authenticated to a legacy authentication service by a combination of the point-of-contact server and a trust proxy such that it appears as if the user was engaged in an authentication dialog.

Figure 4:
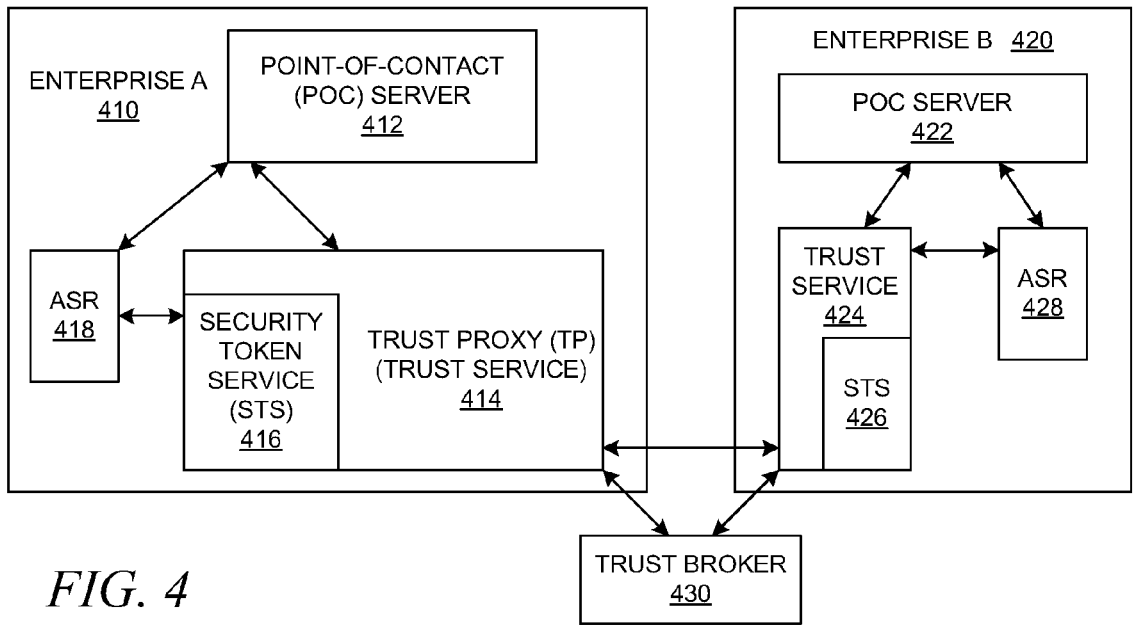
FIG. 4 depicts a block diagram that illustrates an example of some components within a federated architecture that may be used to establish trust relationships to support an implementation of the present invention.

Federated Architecture—Point-of-Contact Servers, Trust Proxies, and Trust Brokers With reference now to FIG. 4, a block diagram depicts an example of a manner in which some components within a federated architecture may be used to establish trust relationships to support an implementation of the present invention. A federated environment includes federated enterprises or similar entities that provide a variety of services for users. A user, through an application on a client device, may attempt to access resources at various entities, such as enterprise 410. A point-of-contact server at each federated enterprise, such as point-of-contact (POC) server 412 at enterprise 410, is the entry point into the federated environment for requests from a client to access resources that are supported and made available by enterprise 410. The point-of-contact server minimizes the impact on existing components within an existing, non-federated architecture, e.g., legacy systems, because the point-of-contact server handles many of the federation requirements. The point-of-contact server provides session management, protocol conversion, and possibly initiates authentication and/or attribute assertion conversion. For example, the point-of-contact server may translate HTTP or HTTPS messages to SOAP and vice versa. As explained in more detail further below, the point-of-contact server may also be used to invoke a trust proxy to translate assertions, e.g., a SAML token received from an issuing party can be translated into a Kerberos token understood by a receiving party.

A trust service (also termed a trust proxy, a trust proxy server, or a trust service), such as trust proxy (TP) 414 at enterprise 410, establishes and maintains a trust relationship between two entities in a federation. A trust service generally has the ability to handle authentication token format translation (through the security token service, which is described in more detail further below) from a format used by the issuing party to one understood by the receiving party.

Together, the use of a point-of-contact server and a trust service minimize the impact of implementing a federated architecture on an existing, non-federated set of systems. Hence, the exemplary federated architecture requires the implementation of at least one point-of-contact server and at least one trust service per federated entity, whether the entity is an enterprise, a domain, or other logical or physical entity. The exemplary federated architecture, though, does not necessarily require any changes to the existing, non-federated set of systems. Preferably, there is a single trust service for a given federated entity, although there may be multiple instances of a trust service component for availability purposes, or there may be multiple trust services for a variety of smaller entities within a federated entity, e.g., separate subsidiaries within an enterprise. It is possible that a given entity could belong to more than one federation, although this scenario would not necessarily require multiple trust services as a single trust service may be able to manage trust relationships within multiple federations.

One role of a trust service may be to determine or to be responsible for determining the required token type by another domain and/or the trust service in that domain. A trust service has the ability or the responsibility to handle authentication token format translation from a format used by the issuing party to one understood by the receiving party. Trust service 414 may also be responsible for any user identity translation or attribute translation that occurs for enterprise 410, or this responsibility may be supported by a distinct identity-and-attribute service, e.g., such as identity-and-attribute service 356 as shown in FIG. 3. In addition, a trust service can support the implementation of aliases as representatives of a user identity that uniquely identify a user without providing any addition information about the user's real world identity. Furthermore, a trust proxy can issue authorization and/or session credentials for use by the point-of-contact server. However, a trust service may invoke a trust broker for assistance, as described further below. Identity translation may be required to map a user's identity and attributes as known to an issuing party to one that is meaningful to a receiving party. This translation may be invoked by either a trust service at an issuing entity, a trust service at a receiving entity, or both.

Trust service 414, or a distinct identity-and-attribute service as mentioned above, may include (or interact with) an internalized component, shown as security token service (STS) component 416, which will provide token translation and will invoke authentication service runtime (ASR) 418 to validate and generate tokens. The security token service provides the token issuance and validation services required by the trust service, which may include identity translation. The security token service therefore includes an interface to existing authentication service runtimes, or it incorporates authentication service runtimes into the service itself. Rather than being internalized within the trust service, the security token service component may also be implemented as a stand-alone component, e.g., to be invoked by the trust service, or it may be internalized within a transaction server, e.g., as part of an application server.

For example, an security token service component may receive a request to issue a Kerberos token. As part of the authentication information of the user for whom the token is to be created, the request may contain a binary token containing a username and password. The security token service component will validate the username and password against, e.g., an LDAP runtime (typical authentication) and will invoke a Kerberos KDC (Key Distribution Center) to generate a Kerberos ticket for this user. This token is returned to the trust service for use within the enterprise; however, this use may include externalizing the token for transfer to another domain in the federation.

A user may desire to access resources at multiple enterprises within a federated environment, such as both enterprise 410 and enterprise 420. In a manner similar to that described above for enterprise 410, enterprise 420 comprises point-of-contact server 422, trust service 424, security token service (STS) 426, and authentication service runtime 428. Although the user may directly initiate separate transactions with each enterprise, the user may initiate a transaction with enterprise 410 which cascades throughout the federated environment. Enterprise 410 may require collaboration with multiple other enterprises within the federated environment, such as enterprise 420, to complete a particular transaction, even though the user may not have been aware of this necessity when the user initiated a transaction. Enterprise 420 becomes involved as a downstream entity, and enterprise 410 may present a assertion to enterprise 420 if necessary in order to further the user's federated transaction.

It may be the case that a trust service does not know how to interpret the authentication token that is received by an associated point-of-contact server and/or how to translate a given user identity and attributes. In this case, the trust service may choose to invoke functionality at a trust broker component, such as trust broker 430. A trust broker maintains relationships with individual trust proxies/services, thereby providing transitive trust between trust services. Using a trust broker allows each entity within a federated environment, such enterprises 410 and 420, to establish a trust relationship with the trust broker rather than establishing multiple individual trust relationships with each entity in the federated environment. For example, when enterprise 420 becomes involved as a downstream entity for a transaction initiated by a user at enterprise 410, trust service 414 at enterprise 410 can be assured that trust service 424 at enterprise 420 can understand an assertion from trust service 414 by invoking assistance at trust broker 430 if necessary. Although FIG. 4 depicts the federated environment with a single trust broker, a federated environment may have multiple trust brokers.

It should be noted that although FIG. 4 depicts point-of-contact server 412, trust service 414, security token service component 416, and authentication service runtime 418 as distinct entities, it is not necessary for these components to be implemented on separate components. For example, it is possible for the functionality of these separate components to be implemented as a single application, as applications on a single physical device, or as distributed applications on multiple physical devices. In addition, FIG. 4 depicts a single point-of-contact server, a single trust service, and a single security token server for an enterprise, but an alternative configuration may include multiple point-of-contact servers, multiple trust services, and multiple security token servers for each enterprise. The point-of-contact server, the trust service, the security token service, and other federated entities may be implemented in various forms, such as software applications, objects, modules, software libraries, etc.

A trust service/STS may be capable of accepting and validating many different authentication credentials, including traditional credentials such as a username and password combinations and Kerberos tickets, and federated authentication token formats, including authentication tokens produced by a third party. A trust service/STS may allow the acceptance of an authentication token as proof of authentication elsewhere. The authentication token is produced by an issuing party and is used to indicate that a user has already authenticated to that issuing party. The issuing party produces the authentication token as a means of asserting the authenticated identity of a user. A trust service/STS is also able to process attribute tokens or tokens that are used to secure communication sessions or conversations, e.g., those that are used to manage session information in a manner similar to an SSL session identifier.

A security token service invokes an authentication service runtime as necessary. The authentication service runtime supports an authentication service capable of authenticating a user. The authentication service acts as an authentication authority that provides indications of successful or failed authentication attempts via authentication responses. The trust service/STS may internalize an authentication service, e.g., a scenario in which there is a brand-new installation of a web service that does not need to interact with an existing legacy infrastructure. Otherwise, the security token service component will invoke external authentication services for validation of authentication tokens. For example, the security token service component could "unpack" a token containing a username/password and then use an LDAP service to access a user registry to validate the presented credentials.

When used by another component such as an application server, the security token service component can be used to produce tokens required for single-sign-on to legacy authentication systems; this functionality may be combined with or replaced by functionality within a single-sign-on protocol service, such as SPS 354 that is shown in FIG. 3. Hence, the security token service component can be used for token translation for internal purposes, i.e. within an enterprise, and for external purposes, i.e. across enterprises in a federation. As an example of an internal purpose, a Web application server may interface to a mainframe via an IBM CICS (Customer Information Control System) transaction gateway; CICS is a family of application servers and connectors that provides enterprise-level online transaction management and connectivity for mission-critical applications. The Web application server may invoke the security token service component to translate a Kerberos ticket (as used internally by the Web application server) to an IBM RACF® passticket required by the CICS transaction gateway.

The entities that are shown in FIG. 4 can be explained using the terminology that was introduced above, e.g., "identity provider" and "service provider". As part of establishing and maintaining trust relationships, an identity provider's trust service can determine what token types are required/accepted by a service provider's trust service. Thus, trust services use this information when invoking token services from a security token service. When an identity provider's trust service is required to produce an authentication assertion for a service provider, the trust service determines the required token type and requests the appropriate token from the security token service.

When a service provider's trust service receives an authentication assertion from an identity provider, the trust service knows what type of assertion that it expected and what type of assertion that it needs for internal use within the service provider. The service provider's trust service therefore requests that the security token service generate the required internal-use token based on the token in the received authentication assertion.

Both trust services and trust brokers have the ability to translate an assertion received from an identity provider into a format that is understood by a service provider. The trust broker has the ability to interpret the assertion format (or formats) for each of the trust services with whom there is a direct trust relationship, thereby allowing the trust broker to provide assertion translation between an identity provider and a service provider. This translation can be requested by either party through its local trust service. Thus, the identity provider's trust service can request translation of an assertion before it is sent to the service provider. Likewise, the service provider's trust service can request translation of an assertion received from an identity provider.

Assertion translation comprises user identity translation, authentication assertion translation, attribute assertion translation, or other forms of assertion translation. Reiterating the point above, assertion translation is handled by the trust components within a federation, e.g., trust services and trust brokers. A trust service may perform the translation locally, either at the identity provider or at the service provider, or a trust service may invoke assistance from a trust broker.

Assuming that an identity provider and a service provider already have individual trust relationships with a trust broker, the trust broker can dynamically create, i.e. broker, new trust relationships between issuing parties and relying parties if necessary. After the initial trust relationship brokering operation that is provided by the trust broker, the identity provider and the service provider may directly maintain the relationship so that the trust broker need not be invoked for future translation requirements. It should be noted that translation of authentication tokens can happen at three possible places: the identity provider's trust service, the service provider's trust service, and the trust broker. Preferably, the identity provider's trust service generates an authentication assertion that is understood by the trust broker to send to the service provider. The service provider then requests a translation of this token from the trust broker into a format recognizable by the service provider. Token translation may occur before transmission, after transmission, or both before and after transmission of the authentication assertion.

Trust Relationships within Federated Architecture

Within an exemplary federated environment that is able to support the present invention, there are two types of "trust domains" that must be managed: enterprise trust domains and federation trust domains. The differences between these two types of trust domain are based in part on the business agreements governing the trust relationships with the trust domain and the technology used to establish trust. An enterprise trust domain contains those components that are managed by the enterprise; all components within that trust domain may implicitly trust each other. In general, there are no business agreements required to establish trust within an enterprise because the deployed technology creates inherent trust within an enterprise, e.g., by requiring mutually authenticated SSL sessions between components or by placing components within a single, tightly controlled data center such that physical control and proximity demonstrate implicit trust. Referring to FIG. 2B, the legacy applications and back-end processing systems may represent an enterprise trust domain, wherein the components communicate on a secure internal network.

Federation trust domains are those that cross enterprise boundaries; from one perspective, a federation trust domain may represent trust relationships between distinct enterprise trust domains. Federation trust domains are established through trust proxies across enterprise boundaries between federation partners. Trust relationships involve some sort of a bootstrapping process by which initial trust is established between trust proxies. Part of this bootstrap process may include the establishment of shared secret keys and rules that define the expected and/or allowed token types and identifier translations. In general, this bootstrapping process can be implemented out-of-band as this process may also include the establishment of business agreements that govern an enterprise's participation in a federation and the liabilities associated with this participation.

There are a number of possible mechanisms for establishing trust in a federated business model. In a federation model, a fundamental notion of trust between the federation participants is required for business reasons in order to provide a level of assurance that the assertions (including tokens and attribute information) that are transferred between the participants are valid. If there is no trust relationship, then the service provider cannot depend upon the assertions received from the identity provider; they cannot be used by the service provider to determine how to interpret any information received from the identity provider.

For example, a large corporation may want to link several thousand global customers, and the corporation could use non-federated solutions. As a first example, the corporation could require global customers to use a digital certificate from a commercial certificate authority to establish mutual trust. The commercial certificate authority enables the servers at the corporation to trust servers located at each of the global customers. As a second example, the corporation could implement third-party trust using Kerberos; the corporation and its global customers could implement a trusted third-party Kerberos domain service that implements shared-secret-based trust. As a third example, the corporation could establish a private scheme with a proprietary security message token that is mutually trusted by the servers of its global customers.

Any one of these approaches may be acceptable if the corporation needed to manage trust relationships with a small number of global customers, but this may become unmanageable if there are hundreds or thousands of potential federation partners. For example, while it may be possible for the corporation to force its smaller partners to implement a private scheme, it is unlikely that the corporation will be able to impose many requirements on its larger partners.

An enterprise may employ trust relationships established and maintained through trust proxies and possibly trust brokers. An advantage of the exemplary federated architecture that is shown in the figures is that it does not impose additional requirements above and beyond the current infrastructures of an enterprise and its potential federation partners.

However, this exemplary federation architecture does not relieve an enterprise and its potential federation partners from the preliminary work required to establish business and liability agreements that are required for participation in the federation. In addition, the participants cannot ignore the technological bootstrapping of a trust relationship. The exemplary federation architecture allows this bootstrapping to be flexible, e.g., a first federation partner can issue a Kerberos ticket with certain information, while a second federation partner can issue a SAML authentication assertion with certain information.

In the exemplary federation architecture, the trust relationships are managed by the trust proxies, which may include (or may interact with) a security token service that validates and translates a token that is received from an identity provider based on the pre-established relationship between two trust proxies. In situations where it is not feasible for a federated enterprise to establish trust relationships (and token translation) with another federated enterprise, a trust broker may be invoked; however, the federated enterprise would need to establish a relationship with a trust broker.

Figure 5:
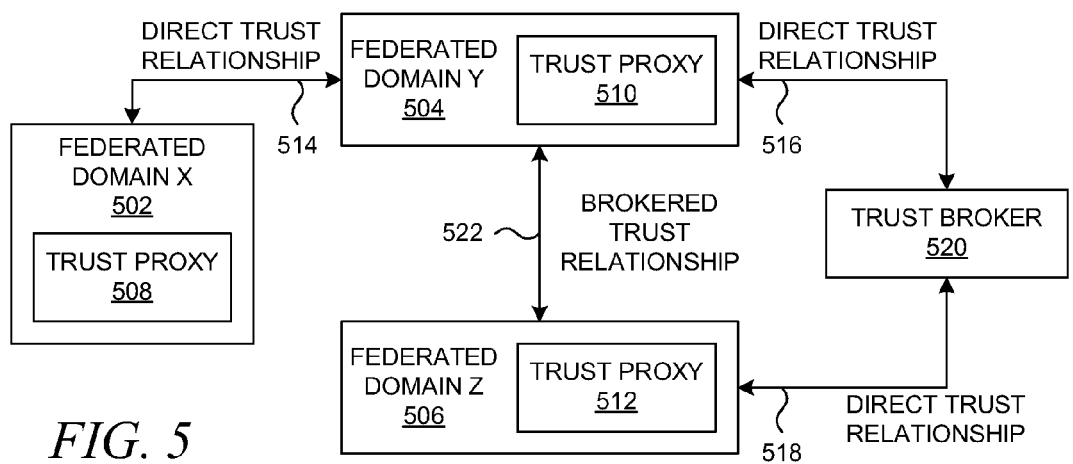
FIG. 5 depicts a block diagram that illustrates an exemplary set of trust relationships between federated domains using trust proxies and a trust broker in accordance with an exemplary federated architecture.

With reference now to FIG. 5, a block diagram depicts an exemplary set of trust relationships between federated domains using trust proxies and a trust broker in accordance with an exemplary federated architecture that is able to support the present invention. Although FIG. 4 introduced the trust broker, FIG. 5 illustrates the importance of transitive trust relationships within the exemplary federated architecture.

Federated domains 502-506 incorporate trust proxies 508-512, respectively. Trust proxy 508 has direct trust relationship 514 with trust proxy 510. Trust broker 520 has direct trust relationship 516 with trust proxy 510, and trust broker 520 has direct trust relationship 518 with trust proxy 512. Trust broker 520 is used to establish, on behalf of a federation participant, a trust relationship based on transitive trust with other federation partners. The principle of transitive trust allows trust proxy 510 and trust proxy 512 to have brokered trust relationship 522 via trust broker 520. Neither trust proxy 510 nor 512 need to know how to translate or validate the other's assertions; the trust broker may be invoked to translate an assertion into one that is valid, trusted, and understood at the other trust proxy.

Business agreements that specify contractual obligations and liabilities with respect to the trust relationships between federated enterprises can be expressed in XML through the use of the ebXML (Electronic Business using XML) standards. For example, a direct trust relationship could be represented in an ebXML document; each federated domain that shares a direct trust relationship would have a copy of a contract that is expressed as an ebXML document. Operational characteristics for various entities within a federation may be specified within ebXML choreographies and published within ebXML registries; any enterprise that wishes to participate in a particular federation, e.g., to operate a trust proxy or trust broker, would need to conform to the published requirements that were specified by that particular federation for all trust proxies or trust brokers within the federation. A security token service could parse these ebXML documents for operational details on the manner in which tokens from other domains are to be translated. It should be noted, though, that other standards and mechanisms could be employed to support the present invention for specifying the details about the manner in which the trust relationships within a federation are implemented.

Single-Sign-on within Federated Architecture

During a given user's session, the user may visit many federated domains to use the web services that are offered by those domains. Domains can publish descriptions of services that they provide using standard specifications such as UDDI and WSDL, both of which use XML as a common data format. The user finds the available services and service providers through applications that also adhere to these standard specifications. SOAP provides a paradigm for communicating requests and responses that are expressed in XML. Entities within a federated environment may employ these standards among others.

Within a federation, a user expects to have a single-sign-on experience in which the user completes a single authentication operation, and this authentication operation suffices for the duration of the user's session, regardless of the federation partners visited during that session. A session can be defined as the set of transactions from (and including) the initial user authentication, i.e. logon, to logout. Within a session, a user's actions will be governed in part by the privileges granted to the user for that session.

The federated architecture that is described hereinabove supports single-sign-on operations. To facilitate a single-sign-on experience, web services that support the federated environment will also support using an authentication assertion or security token generated by a third-party to provide proof of authentication of a user. This assertion will contain some sort of evidence of the user's successful authentication to the issuing party together with an identifier for that user. For example, a user may complete traditional authentication operation with one federation partner, e.g., by providing a username and password that the federation partners uses to build authentication credentials for the user, and then the federation partner is able to provide a SAML authentication assertion that is generated by the authenticating/issuing party to a different federation partner.

The federated environment also allows web services or other applications to request web services, and these web services would also be authenticated. Authentication in a web services environment is the act of verifying the claimed identity of the web services request so that the enterprise can restrict access to authorized clients. A user who requests or invokes a web service would almost always be authenticated, so the need for authentication within a federated environment that supports the present invention is not any different from current requirements of web services for user authentication.

Authentication of users that are accessing the computational resources of an enterprise without participating in a federated session are not impacted by the presence of a federated infrastructure. For example, an existing user who authenticates with a forms-based authentication mechanism over HTTP/S to access non-federated resources at a particular domain is not affected by the introduction of support at the domain for the federated environment. Authentication is handled in part by a point-of-contact server, which in turn may invoke a separate trust proxy or trust service component; the use of a point-of-contact server minimizes the impact on the infrastructure of an existing domain. For example, the point-of-contact server can be configured to pass through all non-federated requests to be handled by the back-end or legacy applications and systems at the domain.

The point-of-contact server may choose to invoke an HTTP-based authentication method, such as basic authentication, forms-based authentication, or some other authentication method. The point-of-contact server also supports a federation domain by supporting the processing of an assertion that has been presented by the user as proof of authentication, such as an SAML authentication assertion, wherein the assertion has crossed between enterprise domains; the single-sign-on protocol service is used to recognize an assertion/artifact when it is received in the context of a federation protocol. The point-of-contact server may invoke the trust service, which in turn may invoke its security token service for validation of authentication credentials/security tokens.

Authentication of web services or other applications comprises the same process as authentication of users. Requests from web services carry a security token containing an authentication assertion, and this security token would be validated by the trust service in the same manner as a token presented by a user. A request from a web service should be accompanied by this token because the web service would have discovered what authentication assertions/security tokens were required by the requested service as advertised in UDDI.

Figure 6:
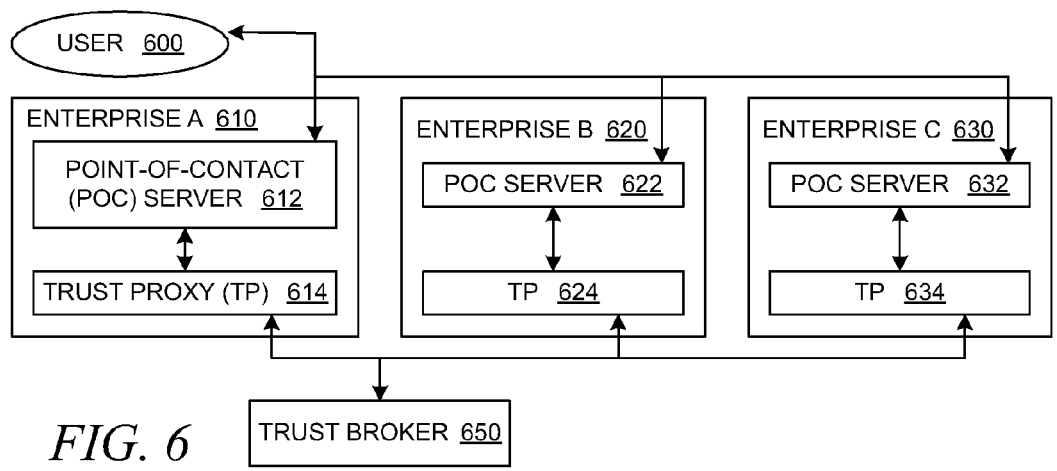
FIG. 6 depicts a block diagram that shows a federated environment that supports federated single-sign-ons.

With reference now to FIG. 6, a block diagram depicts a federated environment that supports federated single-sign-on operations. User 600, through a client device and an appropriate client application, such as a browser, desires to access a web service that is provided by enterprise/domain 610, which supports data processing systems that act as a federated domain within a federated environment. Domain 610 supports point-of-contact server 612 and trust proxy or trust service 614; similarly, domain 620 supports point-of-contact server 622 and trust proxy or trust service 624, while domain 630 supports point-of-contact server 632 and trust proxy or trust service 634. The trust proxies/services rely upon trust broker 650 for assistance, as described above. Additional domains and trust proxies/services may participate in the federated environment. FIG. 6 is used to describe a federated single-sign-on operation between domain 610 and domain 620; a similar operation may occur between domain 610 and domain 630.

The user completes an authentication operation with respect to domain 610; this authentication operation is handled by point-of-contact server 612. The authentication operation is triggered when the user requests access to some resource that requires an authenticated identity, e.g., for access control purposes or for personalization purposes. Point-of-contact server 612 may invoke a legacy authentication service, or it may invoke trust proxy 614 to validate the user's presented authentication credentials. Domain 610 becomes the user's identity provider or home domain for the duration of the user's federated session.

At some later point in time, the user initiates a transaction at a federation partner, such as enterprise 620 that also supports a federated domain, thereby triggering a federated single-sign-on operation. For example, a user may initiate a new transaction at domain 620, or the user's original transaction may cascade into one or more additional transactions at other domains. As another example, the user may invoke a federated single-sign-on operation to a resource in domain 620 via point-of-contact server 612, e.g., by selecting a special link on a web page that is hosted within domain 610 or by requesting a portal page that is hosted within domain 610 but that displays resources hosted in domain 620. Point-of-contact server 612 sends a request to trust proxy 614 to generated a federation single-sign-on token for the user that is formatted to be understood or trusted by domain 620. Trust proxy 614 returns this token to point-of-contact server 612, which sends this token to point-of-contact server 622 in domain. Domain 610 acts as an issuing party for the user at domain 620, which acts as a relying party. The user's token would be transferred with the user's request to domain 620; this token may be sent using HTTP redirection via the user's browser, or it may be sent by invoking the request directly of point-of-contact server 622 (over HTTP or SOAP-over-HTTP) on behalf of the user identified in the token supplied by trust proxy 614.

Point-of-contact server 622 receives the request together with the federation single-sign-on token and invokes trust proxy 624. Trust proxy 624 receives the federation single-sign-on token, validates the token, and assuming that the token is valid and trusted, generates a locally valid token for the user. Trust proxy 624 returns the locally valid token to point-of-contact server 622, which establishes a session for the user within domain 620. If necessary, point-of-contact server 622 can initiate a federated single-sign-on at another federated partner.

Validation of the token at domain 620 is handled by the trust proxy 624, possibly with assistance from a security token service. Depending on the type of token presented by domain 610, the security token service may need to access a user registry at domain 620. For example, domain 620 may provide a binary security token containing the user's name and password to be validated against the user registry at domain 620. Hence, in this example, an enterprise simply validates the security token from a federated partner. The trust relationship between domains 610 and 620 ensures that domain 620 can understand and trust the security token presented by domain 610 on behalf of the user.

Federated single-sign-on requires not only the validation at the relying domain of the security token that is presented to a relying domain on behalf of the user but also, based on information contained in the security token, the determination of a locally valid user identifier and possibly attributes that are associated with this identifier. One result of a direct trust relationship and the business agreements that are required to establish such a relationship is that at least one party, either the issuing domain or the relying domain or both, will know how to translate the information provided by the issuing domain into an identifier that is valid at the relying domain; this identifier at the relying domain may be the result of a one-to-one mapping of the identity asserted by the issuing party or the result of another type of mapping, e.g., a many-to-one mapping of an identity to a role, i.e. it is not a requirement that this be a unique one-to-one mapping for local, issuing party identifiers. In the brief example above, it was assumed that the issuing domain, i.e. domain 610, is able to provide the relying domain, i.e. domain 620, with a user identifier that is valid in domain 620. In that scenario, the relying domain did not need to invoke any identity mapping functionality. Trust proxy 624 at domain 620 will generate a security token for the user that will "vouch-for" this user. The types of tokens that are accepted, the signatures that are required on tokens, and other requirements are all pre-established as part of the federation's business agreements. The rules and algorithms that govern identifier translation are also pre-established as part of the federation's business agreements and are defined by the agreed-upon policy for token management and exchange. In the case of a direct trust relationship between two participants, the identifier translation algorithms will have been established for those two parties and may not be relevant for any other parties in the federation.

However, it is not always the case that the issuing domain will know how to map the user from a local identifier for domain 610 to a local identifier for domain 620. In some cases, it may be the relying domain that knows how to do this mapping, while in yet other cases, neither party will know how to do this translation, in which case a third party trust broker may need to be invoked. In other words, in the case of a brokered trust relationship, the issuing and relying domains do not have a direct trust relationship with each other. They will, however, have a direct trust relationship with a trust broker, such as trust broker 650. Identifier mapping rules and algorithms will have been established as part of this relationship, and the trust broker will use this information to assist in the identifier translation that is required for a brokered trust relationship.

Domain 620 receives the token that is issued by domain 610 at point-of-contract server 622, which invokes trust proxy 624 to validate the token and perform identity mapping. In this case, since trust proxy 624 is not able to map the user from a local identifier for domain 610 to a local identifier for domain 620, trust proxy 624 invokes trust broker 650, which validates the token and performs the identifier mapping. After obtaining the local identifier for the user, trust proxy 624, possibly through its security token service, can generate any local tokens that are required by the back-end applications at domain 620, e.g., a Kerberos token may be required to facilitate single-sign-on from the point-of-contact server to the application server. After obtaining a locally valid token, if required, the point-of-contact server is able to build a local session for the user. The point-of-contact server may also handle coarse-grained authorization of user requests and forward the authorized requests to the appropriate application servers within domain 620.

Federated User Lifecycle Management

A portion of the above description of FIGS. 2-6 explained an organization of components that may be used in a federated environment while other portions explained the processes for supporting single-sign-on operations across the federated environment. Service providers or relying domains within a federated environment do not necessarily have to manage a user's authentication credentials, and those relying domains can leverage a single single-sign-on token that is provided by the user's identity provider or home domain. The description of FIGS. 2-6 above, though, does not explain an explicit process by which federated user lifecycle management may be accomplished in an advantageous manner at the federated domains of federation partners.

Federated user lifecycle management functionality/service comprises functions for supporting or managing federated operations with respect to the particular user accounts or user profiles of a given user at multiple federated domains; in some cases, the functions or operations are limited to a given federated session for the user. In other words, federated user lifecycle management functionality refers to the functions that allow management of federated operations across a plurality of federated partners, possibly only during the lifecycle of a single user session within a federated computing environment.

Each federated domain might manage a user account, a user profile, or a user session of some kind with respect to the functions at each respective federated domain. For example, a particular federated domain might not manage a local user account or user profile within the particular federated domain, but the federated domain might manage a local user session for a federated transaction after the successful completion of a single-sign-on operation at the federated domain. As part of the federated user lifecycle management functionality that is supported by that particular federated domain, the federated domain can participate in a single-sign-off operation that allows the federated domain to terminate the local user session after the federated transaction is complete, thereby improving security and promoting efficient use of resources.

In another example of the use of federated user lifecycle management functionality, a user may engage in an online transaction that requires the participation of multiple federated domains. A federated domain might locally manage a user profile in order to tailor the user's experience with respect to the federated domain during each of the user's federated sessions that involve the federated domain. As part of the federated user lifecycle management functionality that is supported by that particular federated domain, the information in the federated domain's local user profile can be used in a seamless manner during a given federated transaction with information from other profiles at other federated domains that are participating in the given federated transaction. For example, the information from the user's multiple local user profiles might be combined in some type of merging operation such that the user's information is visually presented to the user, e.g., within a web page, in a manner such that the user is not aware of the different origins or sources of the user's information.

Federated user lifecycle management functionality may also comprise functions for account linking/delinking. A user is provided with a common unique user identifier across federation partners, which enables single-sign-on and the retrieval of attributes (if necessary) about a user as part of the fulfillment of a request at one federation partner. Furthermore, the federation partner can request additional attributes from an identity provider using the common unique user identifier to refer to the user in an anonymous manner.

Figure 7:
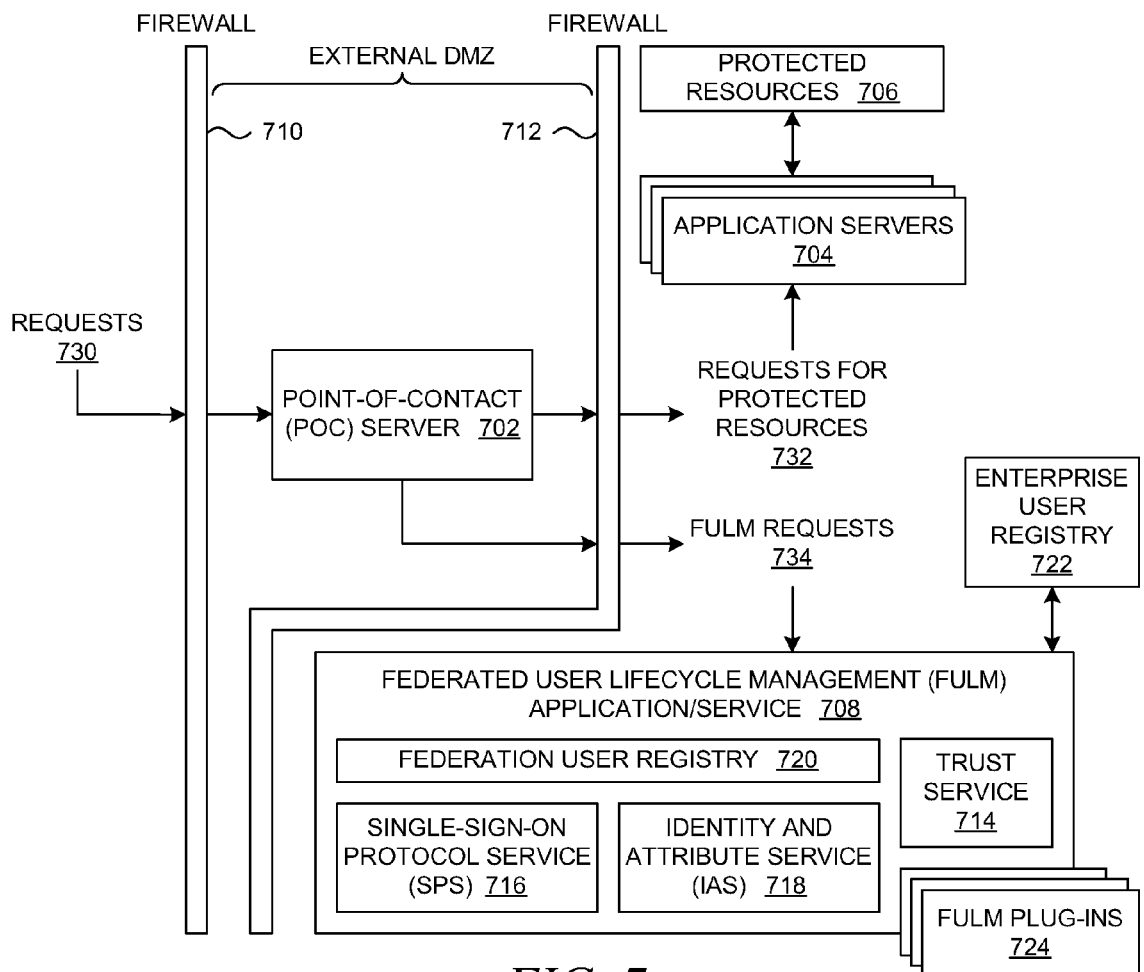
FIG. 7 depicts a block diagram that illustrates some of the components in a federated domain for implementing federated user lifecycle management functionality.

With reference now to FIG. 7, a block diagram depicts some of the components in a federated domain for implementing federated user lifecycle management functionality in order to support the present invention. FIG. 7 depicts elements at a single federated domain, such as the federated domain that is shown in FIG. 3. Some of the elements in FIG. 7 are similar or identical to elements that have been discussed hereinabove with respect to other figures, such as FIG. 3: point-of-contact server/service 702 is equivalent to point-of-contact server 342; application servers 704, which run services that control access to protected resources, are equivalent to application servers 334; protected or controlled resources 706 are equivalent to protected resources 335; and federated user lifecycle management (FULM) application 708 is equivalent to federated user lifecycle management application 352. Although firewalls were not illustrated within FIG.

3, firewalls are illustrated within FIG. 7. Firewall 710 and firewall 712 create an external DMZ (electronic DeMilitarized Zone) that protects the enterprise's computing environment from computing threats outside of the enterprise's domain, e.g., via the Internet.

The different perspectives that are shown in FIG. 3 and FIG. 7 are not incompatible or at cross-purposes. In contrast with the example that is shown in FIG. 7, FIG. 3 does not illustrate the firewalls, yet point-of-contact server 342 resides within federation front-end 340; in addition, federated user lifecycle management application 352 is contained within federation front-end 340. In FIG. 7, point-of-contact server 702 is illustrated as residing within the DMZ between firewalls 710 and 712, which form an electronic or physical front-end to the enterprise domain; in addition, federated user lifecycle management application/service 708 resides electronically behind firewall 712. Trust service 714, single-sign-on protocol service 716, and identity-and-attribute service 718 employ enterprise user registry 720 and federation user registry 722 as necessary. The different perspectives of FIG. 3 and FIG. 7 can be reconciled by regarding federation front-end 340 and back-end 330 in FIG. 3 as a logical organization of components while regarding the DMZ and the other components in FIG. 7 as forming a physical or electronic front-end and a physical or electronic back-end, either of which may contain federated components.

Reiterating the roles of a point-of-contact entity/service, the point-of-contact entity provides session management, at least with respect to a user's interaction with the federation functionality with an enterprise's computing environment; applications within a legacy back-end of the enterprise's computing environment may also implement its own session management functionality. Assuming that an enterprise implements policy functionality with respect to the federated computing environment, the point-of-contact entity may act as a policy enforcement point to some other federation partner's policy decision point. In addition, assuming that it is permissible given the implementation of the federation functionality, the point-of-contact entity is responsible for initiating a direction authentication operation against a user in those scenarios in which a single-sign-on operation is not employed. As such, the point-of-contact entity may be implemented in a variety of forms, e.g., as a reverse proxy server, as a web server plug-in, or in some other manner. The point-of-contact functionality may also be implemented within an application server itself, in which case the federated user lifecycle management services may be logically located within the DMZ.

More importantly, referring again to FIG. 7, federated user lifecycle management application 708 also comprises support for interfacing to, interacting with, or otherwise interoperating with federated user lifecycle management plug-ins 724, which are not shown in FIG. 3. In the exemplary architecture that is shown in FIG. 7, federated protocol runtime plug-ins provide the functionality for various types of independently published or developed federated user lifecycle management standards or profiles, such as: WS-Federation Passive Client; and Liberty Alliance ID-FF Single Sign On (B/A, B/P and LECP), Register Name Identifier, Federation Termination Notification, and Single Logout. Different sets of federated protocols may be accessed at different URI's. This approach allows the federated user lifecycle management application to concurrently support multiple standards or specifications of federated user lifecycle management, e.g., the WS-Federation web services specification versus the Liberty Alliance's specifications, within a single application, thereby minimizing the configuration impact on the overall environment for supporting different federation protocols.

More specifically, the appropriate federated user lifecycle management functionality is invoked by the point-of-contact server by redirecting and/or forwarding user requests to the federated user lifecycle management application as appropriate. Referring again to FIG. 7, point-of-contact server 702 receives user requests 730, which are then analyzed to determine the type of request that has been received, which might be indicated by the type of request message that has been received or, as noted above, by determining the destination URI within the request message. While requests 732 for protected resources continue to be forwarded to application servers 704, requests 734 for federated user lifecycle management functions, e.g., requests to invoke a single-sign-off operation, are forwarded to federated user lifecycle management application 708, which invokes the appropriate federated user lifecycle management plug-in as necessary to fulfill the received request. When a new federation protocol or a new federated function is defined, or when an existing one is somehow modified or refined, support can be added simply by plugging a new support module or can be refined by modifying a previously installed plug-in.

The exemplary implementation of a federated user lifecycle management application in FIG. 7 illustrates that the federated user lifecycle management application is able to support multiple, simultaneous, federated user lifecycle management functions while providing a pluggability feature, thereby allowing new functionality to be added to the federated user lifecycle management application in the form of a plug-in when needed without requiring any changes to the existing infrastructure. For example, assuming that the present invention is implemented using a Java™-based federated user lifecycle management application, support for a new federation protocol, such as a newly published single-sign-on protocol, can be added by configuring newly developed Java™ classes to the Java™ CLASSPATH of the federated user lifecycle management application, wherein these new classes support the new standard along with the protocol interface for supporting the present invention.

The exemplary federated architecture leverages the existing environment in which a federated user lifecycle management solution is to be integrated. The federated user lifecycle management application can be easily modified to support new protocols/standards as they evolve with minimal changes to the overall infrastructure. Any changes that might be required to support new federated user lifecycle management functionality are located almost exclusively within the federated user lifecycle management application, which would require configuring the federated user lifecycle management application to understand the added functionality.

There may be minimal configuration changes in other federated components, e.g., at a point-of-contact server, in order to allow the overall infrastructure to be able to invoke new federated user lifecycle management functionality while continuing to support existing federated user lifecycle management functionality. However, the federated user lifecycle management applications are functionally independent from the remainder of the federated components in that the federated user lifecycle management applications may require only minimal interaction with other federated components of the federated environment. For example, in an exemplary embodiment, the federated user lifecycle management functionality may integrate with an enterprise-based datastore, e.g., an LDAP datastore, if federated user lifecycle management information, such as NameIdentifier values in accordance with the Liberty Alliance profiles, are to be stored in an externally-accessible federated user lifecycle management datastore as opposed to a private, internal, federated user lifecycle management datastore that is not apparent or accessible to external entities.

Hence, an existing environment needs minimal modifications to support federated user lifecycle management functionality. Moreover, changes to federated user lifecycle management functionality, including the addition of new functionality, have minimal impact on an existing federated environment. Thus, when a new single-sign-on standard is published, support for this standard is easily added.

Traditional user authentication involves interaction between an enterprise's computing environment and the end-user only; the manner in which the enterprise chooses to implement this authentication interchange is the choice of the enterprise, which has no impact on any other enterprise. When federation or cross-domain single-sign-on functionality is desired to be supported, however, it becomes a requirement that enterprise partners interact with each other. This requirement cannot be done scalably using proprietary protocols. Although adding support for standards-based federation protocols directly to a point-of-contact entity seems like a robust solution, the point-of-contact entity, which is already an existing component within the enterprise's computing environment, must be modified; moreover, it must be modified every time that one of these public federation protocols changes. Moving this functionality out of the point-of-contact entity provides a more modular approach, wherein this pluggable functionality makes it easy to maintain migrations or updates to these protocols.

Implementing Identity Provider Migration using a Single-Sign-on Operation

As noted further above, there is a tradeoff that should be considered in the implementation of federated protocol operations. Some operations, such as those that might require minimal interaction with the user to complete an operation, should be performed in a manner that is minimally burdensome on the user, but they should also be performed in a manner that is efficient for the federated enterprises, particularly for those types of operations that might be required across all users within an enterprise. With respect to operations that are required in order to support certain federated protocols, a federated enterprise may not have much flexibility in the manner in which those operations are implemented and the resulting burdens on the users and on the federated enterprise's computational resources. A federated enterprise may be required to perform certain actions in certain ways in accordance with federation specifications to which the federated enterprise has agreed. In other words, a federated enterprise may be required by business contracts to implement certain federation operations without regard to the computational burden of those operations.

However, many aspects of functionality within a federated environment could be categorized as operations that support one or more business goals that are desired by one or more enterprises within a federation yet are not necessarily required to support federation protocols or that are not necessarily required in order to participate within a federation. Since the resulting actions for supporting an enterprise-specific business goal may have ramifications across a federated environment, the manner in which the supporting operations are implemented should be accomplished in a manner that is scalable across thousands or millions of users within a federation.

Also as noted further above, federated user lifecycle management (FULM) functionality should not be burdensome to any federated business partner nor their end-users. However, current federated user lifecycle management functionality does not accommodate the types of lifecycle functionality that may be required by the advanced interactions of many enterprises, especially in account linking/delinking operations for a user with respect to identity providers. For example, the FTN (federation termination notification) profile within the Liberty Alliance specifications accomplishes an account delinking operation by simply breaking the link between an identity provider and a service provider. This type of solution does not allow for a "loosely coupled" environment with ease for migrating user relationships between partners within a federation, particularly for migrating a user between identity providers.

For example, consider a scenario that contains three parties: Jane, an employee; employer.com, Jane's employer; and 401k.com, a company that handles an account with retirement funds for Jane at the request of employer.com. As an employee of employer.com, Jane uses computer systems at employer.com; employer.com acts as an identity provider for Jane, and 401k.com acts as a service provider for Jane. Jane has the ability to perform single-sign-on operations from a computer at employer.com to a computer application at 401k.com, e.g., to request certain actions with respect to her account at 401k.com. In this scenario, Jane is required to single-sign-on to 401k.com through employer.com' systems.

When Jane retires from employer.com, Jane would no longer have access to computers at employer.com, and employer.com would want to remove Jane completely from its computer systems. Part of the employee retirement procedures by employer.com would include sending an account delinking request to 401k.com. If employer.com did not request the account delinking, then 401k.com would continue to assume that Jane is authenticated by employer.com, and therefore, Jane can only access her account at 401k.com through a single-sign-on process through the computer systems of employer.com; Jane would not be allowed to authenticate directly with 401k.com, and Jane would not be able to access her account at 401k.com.

It would be advantageous for employer.com to be able to tell 401k.com that Jane will no longer perform single-sign-on operations to 401k.com from employer.com yet allow Jane to begin performing single-sign-on operations from some other party that acts as an identity provider, possibly by sending additional items of information to 401k.com as part of the account delinking operation. However, prior art solutions do not provide such functionality for identity provider migration. For example, it would be advantageous for Jane to indicate that she wants to be able to directly sign-on to 401k.com after the account delinking process or that she would like to sign-on from some other party, such as her Internet Service Provider (ISP) or a major Internet portal. However, in the latter case, the prior art does not provide an approach for employer.com to effect these preferences with 401k.com within a federated computational environment. At best, with prior art approaches, Jane is forced to perform separate tasks in order to accomplish the identity provider migration or identity provider rollover of the present invention, e.g., by setting up direct authentication with 401k.com and then setting up single-sign-on privileges with 401k.com through a third party, such as a major Internet portal that acts as, i.e. provides functionality for acting as, an identity provider for Jane with respect to 401k.com. Such procedures are burdensome to Jane as an end-user. In contrast, the present invention provides functionality for achieving an identity provider migration/rollover operation, as illustrated in more detail hereinbelow after illustrating a prior art scenario in FIGS. 8A-8B.

Figure 8A:
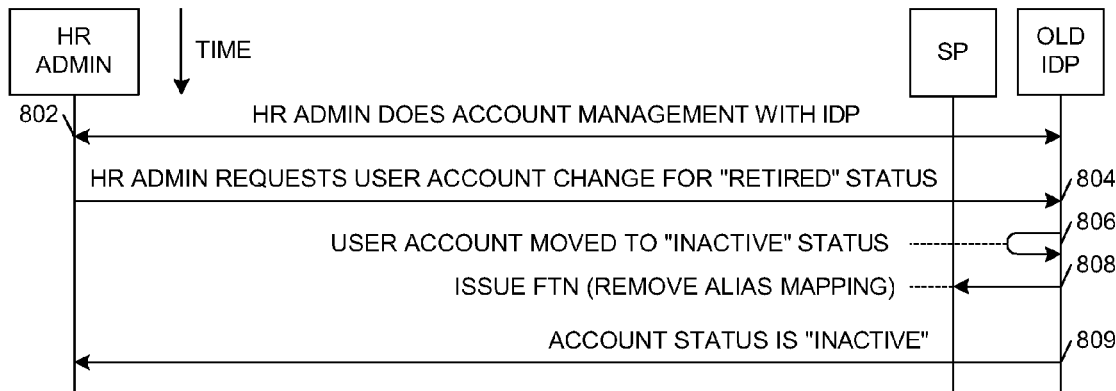
FIGS. 8A-8B depict a pair of dataflow diagrams that show a typical prior art solution for an account delinking operation in accordance with prior art federation protocols.
Figure 8B:
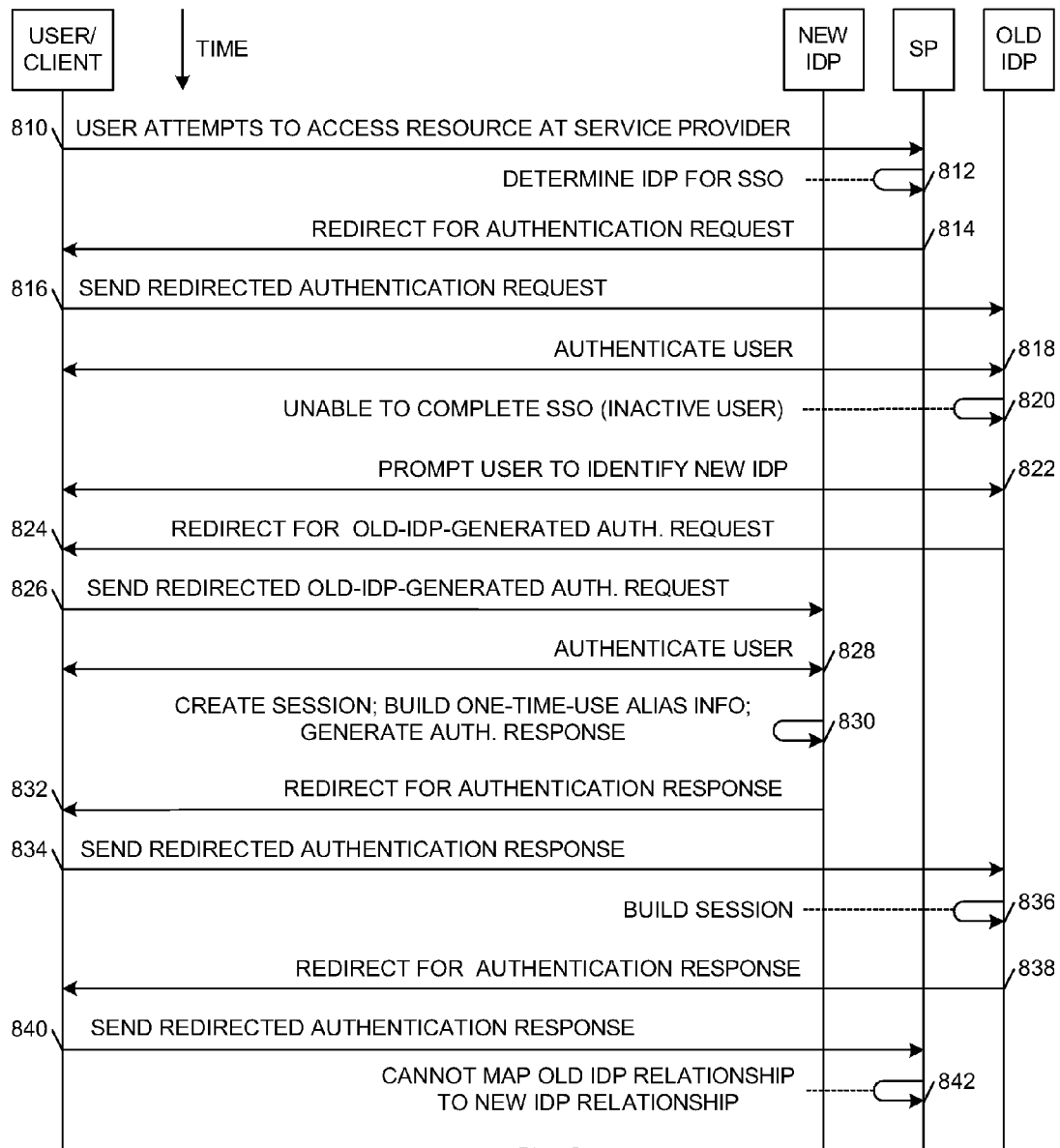

With reference now to FIGS. 8A-8B, a pair of dataflow diagrams depict a typical prior art solution for an account delinking operation in accordance with protocols in prior art federation specifications. Referring to FIG. 8A, over time, a human resources administrator (HR) within employer.com performs administrative account management operations for an employee or user, such as Jane mentioned above, with respect to the user's account at an identity provider, the functionality of which may be assumed to be performed by a computer application or a data processing system at employer.com itself (step 802). At some point in time, the user retires, and the HR administrator requests that the user's account at the identity provider should be modified in some manner to reflect the user's retirement from employer.com and the user's change to retired status (step 804). The old identity provider moves or other demarcates that the user's account is now in an "inactive" status (step 806). The old identity provider then issues an FTN (federation termination notification) request to the service provider to remove the alias mapping that links the user's accounts at the old identity provider and the service provider, e.g., 401k.com (step 808). The old identity provider may then report to the HR administrator that the user's account has been changed to show that it has an inactive status (step 809).

The user's accounts may remain in these states for some period of time until the user desires to initiate some type of management operation with respect to the user's account at the service provider, e.g., to update the user's personal information or to move funds. Referring to FIG. 8B, the user attempts to interact with the service provider by directly accessing a protected resource at the service provider, e.g., by using a browser application to access a protected resource through a web page (step 810). The service provider determines that it needs to authenticate the user. Given configuration information at the service provider that all user's are externally authenticated, or given that a user-provided piece of information, e.g., an HTTP cookie, indicates a third-party identity provider, rather than perform a direct authentication operation, the service provider determines that it needs to perform a single-sign-on operation with the user's identity provider (step 812), which it assumes is still the user's old identity provider. The service provider sends a redirection request to the user's client for an SSO authentication operation at the old identity provider (step 814).

The user's client redirects the authentication request to the old identity provider (step 816). The old identity provider performs an authentication operation with the user (step 818), but the old identity provider determines that it is unable to complete a single-sign-on operation for the user because the user's account has been marked with an inactive status (step 820). The old identity provider may respond to the user's client with an error message that it is unable to perform an SSO authentication operation as requested. However, given that the user's account is in an inactive status, the old identity provider may attempt to determine whether the user has retained the services of a new identity provider by prompting the user to identify the new identity provider (step 822).

After the user provides the identity of the new identity provider, e.g., by providing a domain name or by providing an identifier on which the old identity provider can perform a lookup operation to obtain contact information for the new identity provider, the old identity provider generates another authentication request, i.e. an old-IDP-generated authentication request, and sends it to the new identity provider via the user's client (step 824). The user's client sends the redirected authentication request to the new identity provider (step 826), and in response to receiving it, the new identity provider authenticates the user (step 828). The new identity provider creates a session for the user, builds one-time-use alias information for the user, and generates an authentication response (step 830). The new identity provider generates and sends a redirection message for the authentication response via the user's client (step 832), and the user's client sends the redirected authentication response to the old identity provider (step 834).

The old identity provider will build a session for the user (step 836) and attempt to build an authentication response for the service provider. The old identity provider will build and send an authentication response via the user's client (step 838), and the user's client sends the redirected authentication response to the service provider (step 840).

However, this authentication response will not contain information that can be used by the service provider to migrate the user to the new identity provider as the alias that is provided by the new identity provider will be a one-time-use or anonymous identifier. At this point, the service provider can create a session for the user based on the authentication response from the new identity provider, but the service provider cannot establish various federation-related attributes for the user based on the one-time-use or anonymous alias that has been provided by the new identity provider (step 842). In other words, the service provider cannot map user information from the user's relationship with the old identity provider and the user's relationship with the new identity provider. While the service provider may have information about the user from both the old identity provider and the new identity provider based on the user's authentication attempts, there is no easy way to link this information so that the service provider can subsequently refer to this information for the migration or rollover of the identity provider functionality with respect to the user. A typical prior art solution would entail a requirement for the service provider to create a whole new account for the user and then somehow reconcile the user's old and new accounts at a subsequent point in time, which is burdensome on the user and the service provider.

Another alternative prior art solution for migrating the identity provider functionality for a user would be to temporarily move the user from an authenticatable account at the old identity provider, which supported federated single-sign-on operations to the service provider, to an authenticatable account at the service provider, wherein the service provider would support direct authentication operations for the user. At some later point in time, the user would be moved back to an authenticatable account at a new identity provider, wherein the service provider would no longer support direction authentication operations for the user, and the user would be expected to perform federated single-sign-on operations via the new identity provider. However, this solution can also be administratively burdensome to all parties.

The present invention provide a solution for an account rollover or migration operation as part of an account deactivation process at an identity provider such that a user can migrate between identity providers while maintaining an account at a service provider. A single-sign-on process is modified to allow the old identity provider to identify the user, based on the alias that is shared by the old identity provider and the service provider, and then trigger the federation of the user with a new identity provider so that an alias between the new identity provider and the service provider is established. This process allows the account linking/federation process to be triggered at the new identity provider based on an attempt to perform a single-sign-on from the old identity provider. In this manner, the service provider is not required to de-reference the user to an actual identity simply for the purposes of setting up a new federation with a new identity provider; the service provider is able to continue to refer to the user through the previous alias while establishing the new federation with the new identity provider. The present invention is described below in more detail with reference to the illustrations of multiple embodiments of the present invention in the remaining figures.

Figure 9A:
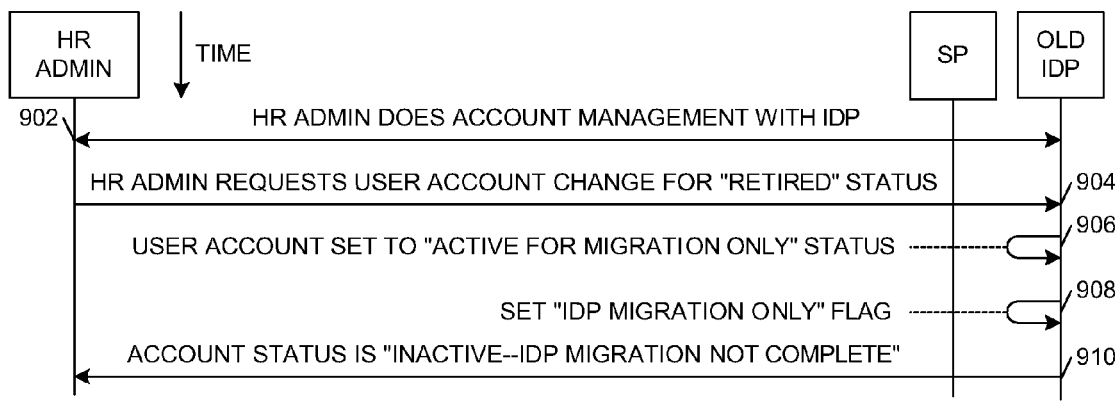
FIG. 9A depicts a dataflow diagram with introductory steps for an identity provider migration operation.

With reference now to FIG. 9A, a dataflow diagram depicts some introductory steps for initiating an identity provider migration operation in accordance with an embodiment of the present invention. Over time, a human resources administrator (HR) within employer.com performs administrative account management operations for an employee or user, such as Jane mentioned above, with respect to the user's account at an identity provider (IDP), the functionality of which may be assumed to be performed by a computer application or a data processing system at employer.com itself (step 902). At some point in time, the user retires, and the HR administrator, through an appropriate client application, requests that the user's account at the identity provider should be modified in some manner to reflect the user's retirement from employer.com and the user's change to retired status (step 904). The old identity provider moves or otherwise demarcates that the user's account is now in an "active for migration/rollover only" status (step 906). After this point in time, the only user-initiated functionality that will be allowed is the initiation of an identity provider migration/rollover operation. An optional step would include setting an "IDP migration only" flag by the old identity provider on its identity provider-service provider alias mapping for the user (step 908). In this manner, the identity mapping functionality can be handled independently from the FULM mapping, e.g., in accordance with an enterprise policy. The old identity provider then issues a response to the human resources administrator that the user's account has a status that reflects that the user's account is "inactive—IDP migration not yet complete" (step 910).

Figure 9C:
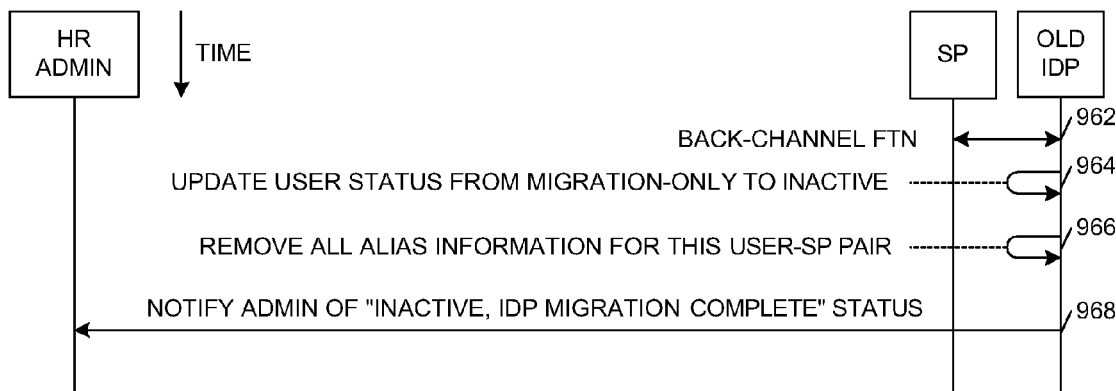
FIG. 9C depicts a dataflow diagram that shows cleanup steps during an identity provider migration operation between an old identity provider and a service provider.
Figure 9B:
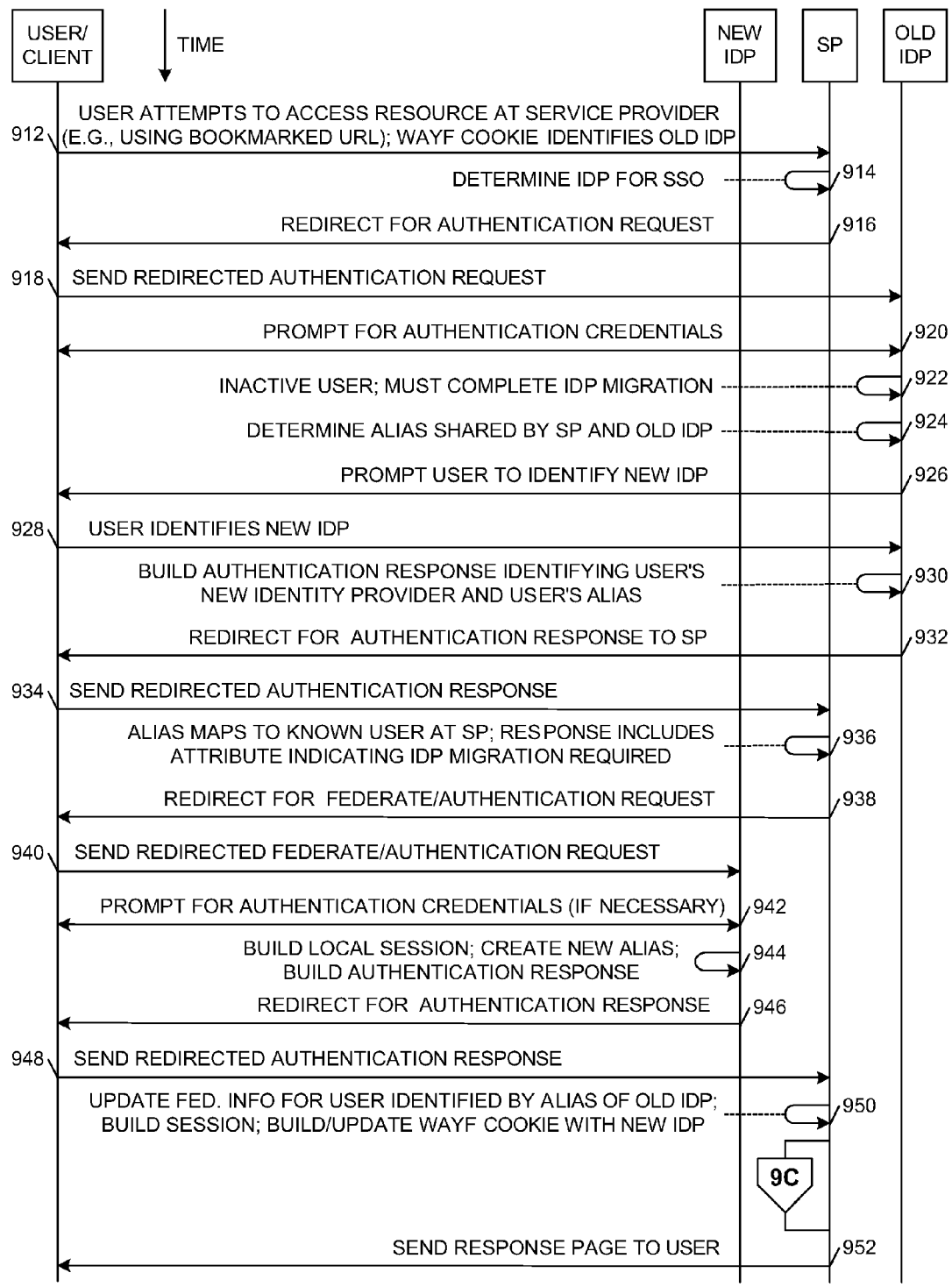
FIG. 9B depicts a dataflow diagram that shows exemplary steps during an identity provider migration operation which has been initiated by invocation of a pull-type SSO and in which the old identity provider is responsible for prompting a user to provide the identity of the new identity provider.

With reference now to FIG. 9B, a dataflow diagram depicts exemplary processing steps during an identity provider migration operation which has been initiated by invocation of a pull-type single-sign-on operation and in which the old identity provider is responsible for prompting a user to provide the identity of the new identity provider in accordance with an embodiment of the present invention. The steps that are shown in FIG. 9B occur some time after the steps that are shown in FIG. 9A in which the user's account at the user's old identity provider has been modified to show that it is in an "active for IDP migration only" status; the user's account may remain in that state for some period of time until the user desires to initiate some type of management operation with respect to the user's account at the service provider, e.g., to update the user's personal information, to move funds, or whatever action might be appropriate for the type of service provider.

Referring to FIG. 9B, the user attempts to interact with the service provider by directly accessing a protected resource at the service provider, e.g., by using a browser application to access a protected resource through a web page (step 912), possibly by using a bookmarked URL that is stored by a web browser. The web browser sends along any appropriate cookies for the service provider, which in the example that is shown in FIG. 9B includes a WAYF (Where Are You From) cookie that indicates or identifies the user's old identity provider. The service provider determines that it needs to authenticate the user. Given the type of user account and the fact that the service provider received a cookie that identifies the user's old identity provider, rather than perform a direct authentication operation, the service provider determines that it needs to perform a single-sign-on operation with the user's old identity provider (step 914). At this point in time, the service provider does not know that the old identity provider requires that the user must migrate to a new identity provider. The service provider sends a redirection request to the user's client for an SSO authentication operation at the old identity provider (step 916).

The user's client redirects the authentication request to the old identity provider (step 918). The old identity provider prompts the user for authentication credentials or otherwise authenticates the user (step 920), but the old identity provider determines that it is unable to complete a single-sign-on operation for the user because the user's account has been marked with an inactive status and that the user must complete an identity provider migration operation (step 922). It should be noted that the authentication operation with the user at step 920 does not result in the creation of an ongoing session that has any sort of privileges for completing other operations with respect to the old identity provider.

The old identity provider can determine the alias that is shared between the service provider and the old identity provider (step 924). The identity provider also prompts the user to identify the new identity provider (step 926), e.g., with a web page that might ask a series of questions that is appropriate for the nature of the old identity provider and/or the nature of the service provider. For example, if the old identity provider is the user's previous employer, then the old identity provider could ask whether the user has changed employers. The user responds with identity information for the new identity provider (step 928), e.g., by providing a domain name or by providing an identifier on which the old identity provider can perform a lookup operation to obtain contact information for the new identity provider. The old identity provider then builds an authentication response that identifies the user's new identity provider and the user's alias as shared between the old identity provider and the service provider (step 930); the response also indicates that the user is required to complete an identity provider migration operation.

The old identity provider generates and sends a redirection message for the authentication response via the user's client (step 932), which sends the redirected authentication request to the service provider (step 934).

The service provider is able to use the alias that is provided by the old identity provider to locate the user's information as known to the service provider, i.e., to locate the service provider's account for the user (step 936). The response also includes an attribute that indicates that the user is required to complete an identity provider migration operation. The service provider extracts the identifier of the new identity provider from the response; all of the returned information can be locally cached within the user's current session at the service provider.

The service provider then generates and sends a redirection message for a federate/authentication request to the new identity provider via the user's client (step 938), which sends the redirected federate/authentication request to the new identity provider (step 940).

The new identity provider may then prompt the user to provide authentication credentials if necessary (step 942). The new identity provider generates a new alias for the user that will be shared with the service provider; the new alias may be stored locally within the user account information at the new identity provider. The new identity provider builds a local session for the user and generates an authentication response (step 944), wherein the authentication response contains the newly generated alias. The new identity provider then sends the authentication response within a redirection message to the service provider via the user's client (step 946), which sends the redirected authentication response to the service provider (step 948).

Upon receiving the authentication response, the service provider performs multiple steps in order to prepare to fulfill protected resource requests for the user via the new identity provider, i.e. to complete the identity provider migration operation for this particular user. The service provider updates the federation information for the user identified by the alias from the old identity provider (step 950), including changing the IDP identifier and the alias from the old identity provider values to the new identity provider values, e.g., by updating, modifying, or overwriting such information within a local account record. The service provider builds a session for the user, and the service provider modifies the user's previous WAYF cookie or generates a new WAYF cookie with information about the new identity provider. The service provider may then perform some cleanup operations with the old identity provider as shown in FIG. 9C, after which the service provider may respond directly to the user's client (step 952), e.g., with a web page that welcomes the user.

With reference now to FIG. 9C, a dataflow diagram depicts cleanup steps during an identity provider migration operation between an old identity provider and a service provider in accordance with an embodiment of the present invention. The processing steps that are shown in FIG. 9C may be viewed as part of an administrative cleanup operation to resolve pending status issues as discussed above with respect to FIG. 9A. Moreover, the processing steps that are shown in FIG. 9C may be performed during an identity provider migration operation, as shown in FIG. 9B.

At some point in time, the service provider determines that a user has been successfully migrated from an old identity provider to a new identity provider, and the service provider interacts with the old identity provider to complete a back-channel FTN (federation termination notification) operation (step 962). The old identity provider updates the user's account from "active for migration/rollover only" status to "inactive—migration complete" status (step 964). It should be noted that various embodiments may be implemented in which the user status is updated at different levels of granularity. For example, the old identity provider may manage multiple aliases for the user with respect to many different service providers, so the identity provider migration operation may be effective with respect to all service providers or to only this particular service provider, in which case an implementation of an embodiment of the present invention may allow the user's status to remain unchanged until the user completes an identity provider migration operation with respect to all service providers that are known to the old identity provider for the given user. The old identity provider may then optionally remove all alias information for this user-service provider pairing (step 966); alternatively, the information may be archived in some manner in accordance with an administrative policy. The old identity provider then optionally sends a message to an administrator, e.g., the human resources administrator that was discussed with respect to FIG. 9A, that notifies the administrator that the user's account has changed status to "inactive—migration complete" (step 968). The notification message may be targeted at an administrative software application such that various other administrative tasks can be programmatically triggered with respect to the user based on the user's new status.

Figure 9D:
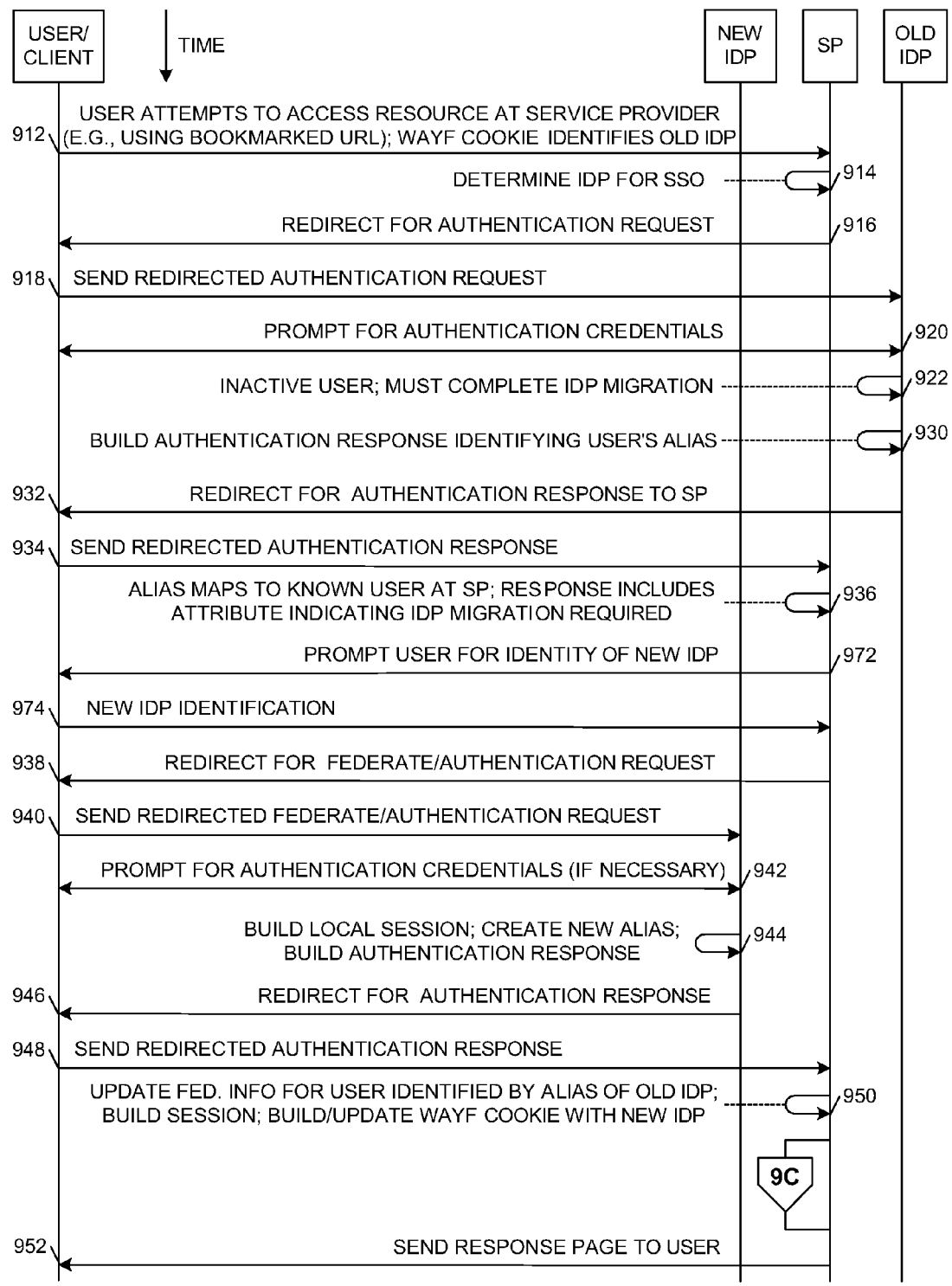
FIG. 9D depicts a dataflow diagram that shows exemplary steps during an identity provider migration operation which has been initiated by invocation of a pull-type SSO and in which the service provider is responsible for prompting a user to provide the identity of the new identity provider.

With reference now to FIG. 9D, a dataflow diagram depicts exemplary processing steps during an identity provider migration operation which has been initiated by invocation of a pull-type single-sign-on operation and in which the service provider is responsible for prompting a user to provide the identity of the new identity provider in accordance with an embodiment of the present invention. The steps that are shown in FIG. 9D occur some time after the steps that are shown in FIG. 9A in which the user's account at the user's old identity provider has been modified to show that it is in an "active for IDP migration only" status; the user's account may remain in that state for some period of time until the user desires to initiate some type of management operation with respect to the user's account at the service provider, e.g., to update the user's personal information, to move funds, or whatever action might be appropriate for the type of service provider.

FIG. 9D is similar to FIG. 9B; identical reference numerals refer to identical steps. FIG. 9D differs from FIG. 9B in that, whereas FIG. 9B illustrates a process in which the old identity provider is responsible for obtaining an identifier or identifying information for the new identity provider from the user, FIG. 9D illustrates a process in which the service provider is responsible for obtaining an identifier or identifying information for the new identity provider from the user. Steps 926 and 928 as shown in FIG. 9B are not shown in FIG. 9D. Instead, FIG. 9D shows that the service provider prompts the user for the identity of the new identity provider (step 972) and receives identification information for the new identity provider from the user/client (step 974).

Figure 10A:
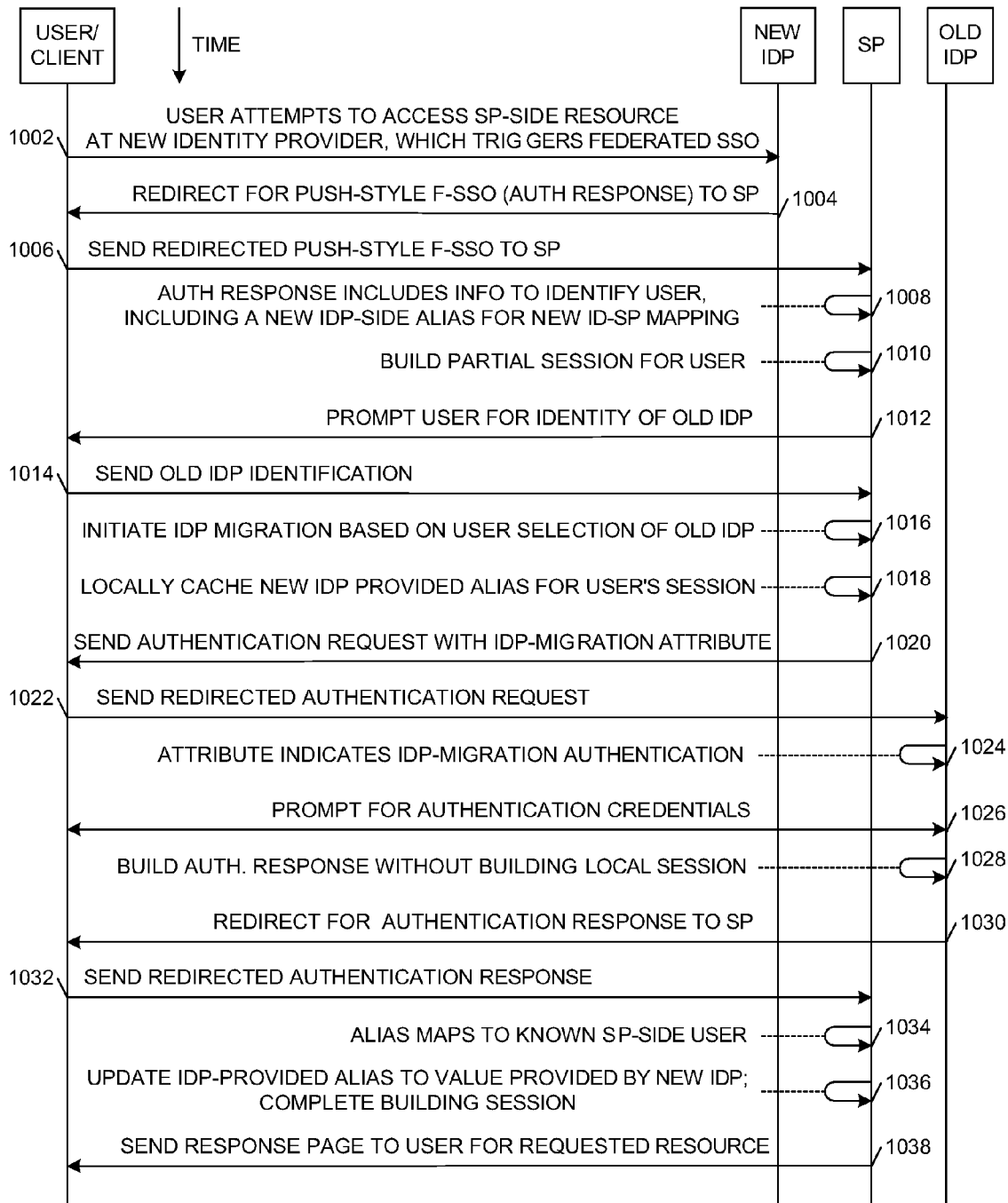
FIG. 10A depicts a dataflow diagram that shows steps during an IDP migration operation which has been initiated with a push-type single-sign-on operation and in which the service provider is responsible for prompting a user to provide the identity of the new identity provider.

With reference now to FIG. 10A, a dataflow diagram depicts exemplary processing steps during an identity provider migration operation which has been initiated by invocation of a push-type single-sign-on operation and in which the service provider is responsible for prompting a user to provide the identity of the new identity provider in accordance with an embodiment of the present invention. The steps that are shown in FIG. 10A may occur some time after the steps that are shown in FIG. 9A in which the user's account at the user's old identity provider has been modified to show that it is in an "active for IDP migration only" status; the user's account may remain in that state for some period of time until the user desires to initiate some type of management operation with respect to the user's account at the service provider, e.g., to update the user's personal information, to move funds, or whatever action might be appropriate for the type of service provider.

Referring now to FIG. 10A, a scenario is shown in which the user has interacted with the new identity provider, e.g., by authenticating to the new identity provider and using protected resources at the new identity provider. At some point in time, the user attempts to access protected resources at the service provider via the new identity provider, e.g., by using a browser application to access hyperlinks to those resources on a web page from the new identity provider (step 1002); for example, the new identity provider has a trust relationship with the service provider that allows the new identity provider to offer certain resources in a convenient manner to the users of the new identity provider. In response, the new identity provider generates a push-style F-SSO (federated single sign-on) message, e.g., equivalent to a federated authentication response, to the service provider that supports the protected resource that the user has selected; this message is sent in a redirection message by the new identity provider to the service provider via the user's client (step 1004). The user's client then sends the redirected message to the service provider (step 1006).

At this point in time, the user is requesting to access a resource at the service provider through a new identity provider which the user has not used previously with respect to the service provider. Thus, the service provider does not immediately resolve to give access to the user.

The service provider examines the received F-SSO message and determines that it includes enough information to identify the user to a sufficient extent to use JIT (Just-In-Time) provisioning to perform a limited amount of processing for the user (step 1008); in this information, the service provider also receives new IDP-side alias for the user from the new identity provider in order to manage a new identity provider-service provider mapping, which may be stored in the user account record in a local datastore. The service provider then builds a partial session for the user (step 1010) since the user's complete profile is not known; in other words, the partial session may have very limited capabilities such that the identity provider migration operation may continue. The user is then prompted to identify or otherwise provide identification information for the user's old identity provider (step 1012), e.g., by asking the user a set of appropriate questions on a web page/form or by providing a set of selectable controls within a web page/form, to which the user via the user's client responds with information about the old identity provider (step 1014). If the information is successfully obtained, then the service provider determines to initiate an identity provider migration operation based on the identity of the old identity provider that was provided by the user (step 1016). The service provider locally caches the new alias that was provided by the new identity provider for the user's session (step 1018).

The service provider then generates and sends a redirection message for an authentication request to the old identity provider via the user's client (step 1020), which sends the redirected authentication request to the old identity provider (step 1022). The authentication request contains an attribute that indicates that the service provider is requesting an IDP-migration authentication, thereby indicating the special type of authentication to be performed by the old identity provider, which is detected by the old identity provider upon examination of the received message (step 1024). The old identity provider prompts the user for authentication credentials or otherwise performs an authentication operation for the user (step 1026), and the old identity provider then generates an authentication response without building a local session for the user (step 1028). The old identity provider then sends the authentication response in a redirection message via the user's client (step 1030), which sends the redirected authentication response to the service provider (step 1032).

Upon receipt of the authentication response, the service provider determines that the alias that was provided by the old identity provider within the authentication response maps to a known service provider user (step 1034), i.e. a user that was previously known to the service provider and for which the service provider already has some type of account in conjunction with previous operations with the old identity provider. The service provider updates the user's account to set the IDP-provided alias to be the value that was provided by the new identity provider (step 1036). The service provider also completes the building of the user's session now that the user's complete profile is known, e.g., based on previously stored information in the user's account at the service provider. Since the IDP-migration operation has been successful, then JIT provisioning is not required. The service provider then returns a response to the user (step 1038), e.g., a web page that reveals sensitive information that was requested by the user through a hyperlink that was provided to the user by the new identity provider. The service provider may also return a WAYF cookie with the resource response.

Figure 10B:
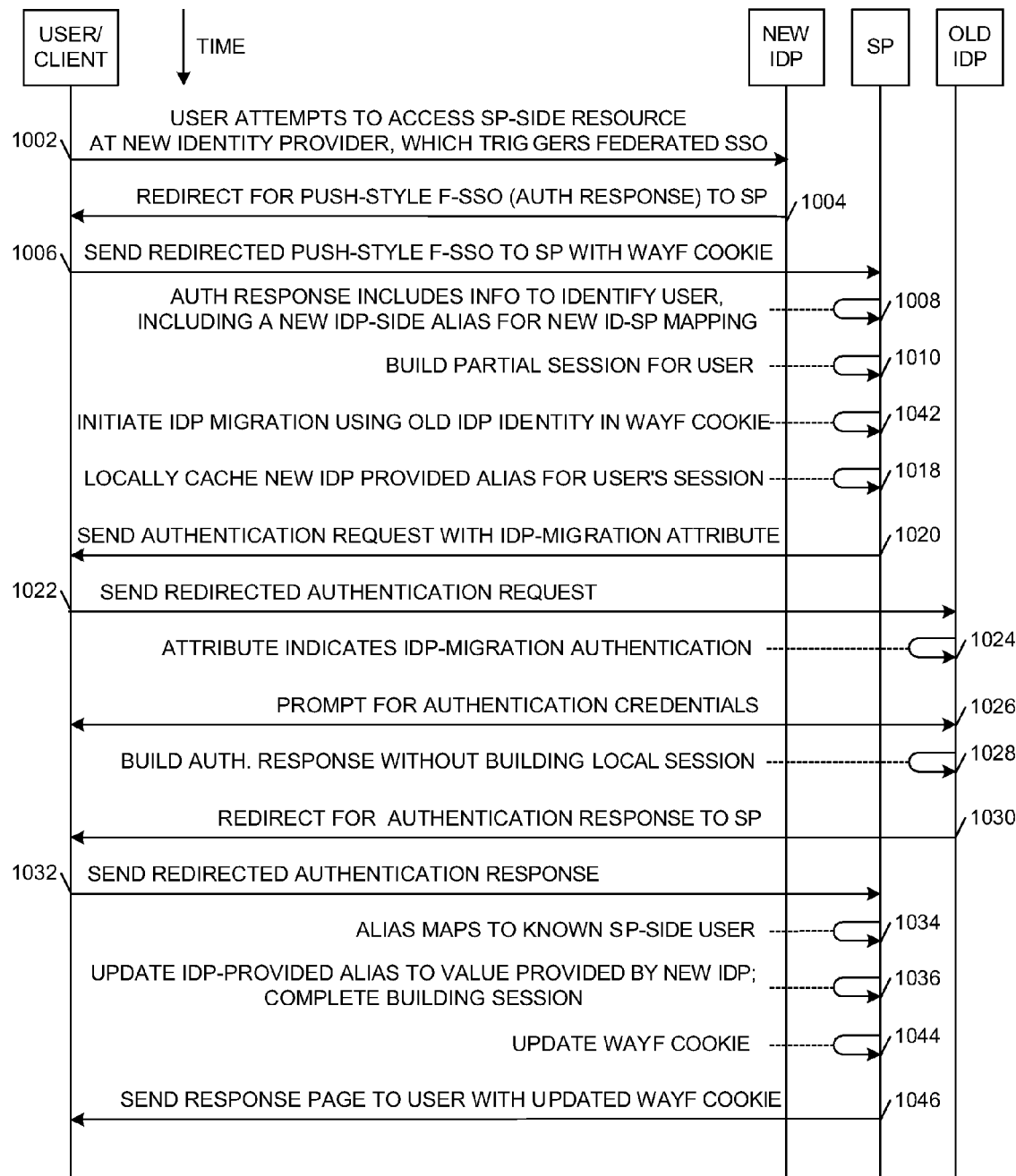
FIG. 10B depicts a dataflow diagram that shows processing steps during an identity provider migration operation which has been initiated by invocation of a push-type single-sign-on operation and in which the identity of the old identity provider is obtained from information within a WAYF cookie.

With reference now to FIG. 10B, a dataflow diagram depicts exemplary processing steps during an identity provider migration operation which has been initiated by invocation of a push-type single-sign-on operation and in which the identity of the old identity provider is obtained from information within a WAYF cookie in accordance with an embodiment of the present invention. The steps that are shown in FIG. 10B may occur some time after the steps that are shown in FIG. 9A in which the user's account at the user's old identity provider has been modified to show that it is in an "active for IDP migration only" status; the user's account may remain in that state for some period of time until the user desires to initiate some type of management operation with respect to the user's account at the service provider, e.g., to update the user's personal information, to move funds, or whatever action might be appropriate for the type of service provider.

FIG. 10B is similar to FIG. 10A; identical reference numerals refer to identical steps. FIG. 10B differs from FIG. 10A in that, whereas FIG. 10A illustrates a process in which the service provider is responsible for obtaining an identifier or identifying information for the old identity provider by prompting the user, FIG. 10B illustrates a process in which the service provider obtains an identifier or identifying information for the new identity provider from a WAYF cookie. Steps 1012 and 1014 as shown in FIG. 10A are not shown in FIG. 10B. Instead, FIG. 10B shows that the service provider obtains the identity of the old identity provider from a WAYF cookie (step 1042); the WAYF cookie would be received from the user's client during the redirection of the push-style F-SSO message at step 1006. The WAYF cookie would have been cached by the user's client application, e.g., a browser application, during previous transactions with the service provider in conjunction with the user's interactions at the old identity provider. FIG. 10B also shows that the service provider updates the WAYF cookie to indicate that the user is now federated with the new identity provider (step 1044) and that the service provider returns the updated WAYF cookie with the response to the resource request (step 1046).

CONCLUSION

The advantages of the present invention should be apparent in view of the detailed description of the invention that is provided above. The present invention is advantageous because it provides a solution for an account rollover or migration operation as part of an account deactivation process at an identity provider such that a user can migrate between identity providers while maintaining an account at a service provider. In one embodiment, a single-sign-on process is modified to allow the old identity provider to identify the user, based on the alias that is shared by the old identity provider and the service provider, and then trigger the federation of the user with a new identity provider so that an alias between the new identity provider and the service provider is established. This process allows the account linking/federation process to be triggered at the new identity provider based on an attempt to perform a single-sign-on from the old identity provider. In this manner, the service provider is not required to de-reference the user to an actual identity simply for the purposes of setting up a new federation with a new identity provider; the service provider is able to continue to refer to the user through the previous alias while establishing the new federated relationship for the user with the new identity provider. Other embodiments allow a new identity provider to trigger the identity provider migration operation.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, etc. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for operating a federated computational environment, wherein a first user account for a user is managed at a first identity provider, wherein a second user account for the user is managed at a second identity provider, wherein a third user account for the user is managed at a service provider, wherein the first identity provider, the second identity provider, and the service provider operate within the federated computational environment, the computer-implemented method comprising:
   receiving at the service provider a request to access by the user a protected resource that is managed by the service provider;
   performing, after receiving the request to access the protected resource, a federated single-sign-on operation for the user between the service provider and the first identity provider;
   modifying, prior to sending a response to the request to access the protected resource, information in the third user account to indicate that the service provider relies upon the second identity provider to authenticate the user on behalf of the service provider rather than the first identity provider; and
   sending a response for the request to access the protected resource.

2. The method of claim 1 further comprising:
   triggering the request for the protected resource by a direct request from the user to the service provider.

3. The method of claim 1 further comprising:
   triggering the request for the protected resource by an indirect request from the user to the second identity provider.

4. The method of claim 1 further comprising:
   establishing, prior to receiving the request to access the protected resource, a first alias identifier for the user between the first identity provider and the service provider to link the first user account and the third user account.

5. The method of claim 4 further comprising:
   establishing, after receiving the request to access the protected resource and prior to sending the response to the request to access the protected resource, a second alias identifier for the user between the second identity provider and the service provider to link the second user account and the third user account.

6. The method of claim 5 further comprising:
   employing by the service provider the second alias identifier for the user in place of the first alias identifier during federated single-sign-on operations.

7. The method of claim 5 further comprising:
   replacing by the service provider an alias mapping for the user.

8. The method of claim 5 further comprising:
   replacing by the service provider an alias mapping for the user during the federated single-sign-on operation.

9. The method of claim 1 further comprising:
   extracting by the service provider identifying information for the first identity provider from a cookie in order to determine by the service provider to use the first identity provider to perform the federated single-sign-on operation for the user.

10. The method of claim 1 further comprising:
    prompting the user by the service provider to obtain identifying information for the first identity provider in order to determine by the service provider to use the first identity provider to perform the federated single-sign-on operation for the user.

11. The method of claim 1 further comprising:
    modifying, prior to receiving at the service provider the request to access the protected resource, information in the first user account to indicate that operations with respect to the first user account are restricted until the user completes an identity provider migration operation.

12. The method of claim 1 further comprising:
    modifying, after receiving at the service provider the request to access the protected resource and prior to sending by the service provider the response to the request to access the protected resource, information in the first user account to indicate that the user has completed an identity provider migration operation with respect to the service provider.

13. The method of claim 1 further comprising:
    modifying, after receiving at the service provider the request to access the protected resource and prior to sending by the service provider the response to the request to access the protected resource, information in the first user account to indicate that the first user account is deactivated.

14. The method of claim 1 further comprising:
    prompting, after receiving at the service provider the request to access the protected resource and prior to sending by the service provider the response to the request to access the protected resource, the user by the first identity provider to obtain identifying information for the second identity provider in order to determine an identity of the second identity provider to perform the federated single-sign-on operation for the user.

15. The method of claim 1 further comprising:
    prompting, after receiving at the service provider the request to access the protected resource and prior to sending by the service provider the response to the request to access the protected resource, the user by the service provider to obtain identifying information for the second identity provider in order to determine an identity of the second identity provider to perform the federated single-sign-on operation for the user.

16. A computer program product on a computer readable storage medium for use in a data processing system for operating a federated computational environment, wherein a first user account for a user is managed at a first identity provider, wherein a second user account for the user is managed at a second identity provider, wherein a third user account for the user is managed at a service provider, wherein the first identity provider, the second identity provider, and the service provider operate within the federated computational environment, the computer program product comprising:

instructions for receiving at the service provider a request to access by the user a protected resource that is managed by the service provider;

instructions for performing, after receiving the request to access the protected resource, a federated single-sign-on operation for the user between the service provider and the first identity provider;

instructions for modifying, prior to sending a response to the request to access the protected resource, information in the third user account to indicate that the service provider relies upon the second identity provider to authenticate the user on behalf of the service provider rather than the first identity provider; and instructions for sending a response for the request to access the protected resource.

17. The computer program product of claim 16 further comprising:

instructions for triggering the request for the protected resource by a direct request from the user to the service provider.

18. The computer program product of claim 16 further comprising:

instructions for triggering the request for the protected resource by an indirect request from the user to the second identity provider.

19. The computer program product of claim 16 further comprising:

instructions for establishing, prior to receiving the request to access the protected resource, a first alias identifier for the user between the first identity provider and the service provider to link the first user account and the third user account.

20. The computer program product of claim 19 further comprising:

instructions for establishing, after receiving the request to access the protected resource and prior to sending the response to the request to access the protected resource, a second alias identifier for the user between the second identity provider and the service provider to link the second user account and the third user account.

21. The computer program product of claim 20 further comprising:

instructions for employing by the service provider the second alias identifier for the user in place of the first alias identifier during federated single-sign-on operations.

22. The computer program product of claim 20 further comprising:

instructions for replacing by the service provider an alias mapping for the user.

23. The computer program product of claim 20 further comprising:

instructions for replacing by the service provider an alias mapping for the user during the federated single-sign-on operation.

24. The computer program product of claim 16 further comprising:

instructions for extracting by the service provider identifying information for the first identity provider from a cookie in order to determine by the service provider to use the first identity provider to perform the federated single-sign-on operation for the user.

25. The computer program product of claim 16 further comprising:

instructions for prompting the user by the service provider to obtain identifying information for the first identity provider in order to determine by the service provider to use the first identity provider to perform the federated single-sign-on operation for the user.

26. The computer program product of claim 16 further comprising:

instructions for modifying, prior to receiving at the service provider the request to access the protected resource, information in the first user account to indicate that operations with respect to the first user account are restricted until the user completes an identity provider migration operation.

27. The computer program product of claim 16 further comprising:

instructions for modifying, after receiving at the service provider the request to access the protected resource and prior to sending by the service provider the response to the request to access the protected resource, information in the first user account to indicate that the user has completed an identity provider migration operation with respect to the service provider.

28. The computer program product of claim 16 further comprising:

instructions for modifying, after receiving at the service provider the request to access the protected resource and prior to sending by the service provider the response to the request to access the protected resource, information in the first user account to indicate that the first user account is deactivated.

29. The computer program product of claim 16 further comprising:

instructions for prompting, after receiving at the service provider the request to access the protected resource and prior to sending by the service provider the response to the request to access the protected resource, the user by the first identity provider to obtain identifying information for the second identity provider in order to determine an identity of the second identity provider to perform the federated single-sign-on operation for the user.

30. The computer program product of claim 16 further comprising:

instructions for prompting, after receiving at the service provider the request to access the protected resource and prior to sending by the service provider the response to the request to access the protected resource, the user by the service provider to obtain identifying information for the second identity provider in order to determine an identity of the second identity provider to perform the federated single-sign-on operation for the user.

31. An apparatus for operating a federated computational environment, wherein a first user account for a user is managed at a first identity provider, wherein a second user account for the user is managed at a second identity provider, wherein a third user account for the user is managed at a service provider, wherein the first identity provider, the second identity provider, and the service provider operate within the federated computational environment, the apparatus comprising:
- a processor;
- a data store in which a set of set of instructions are stored, the set of instructions that when executed by the processor carry out an identity provider migration operation; wherein the set of instructions comprise:
- instructions for receiving at the service provider a request to access by the user a protected resource that is managed by the service provider;
- instructions for performing, after receiving the request to access the protected resource, a federated single-sign-on operation for the user between the service provider and the first identity provider;
- instructions for modifying, prior to sending a response to the request to access the protected resource, information in the third user account to indicate that the service provider relies upon the second identity provider to authenticate the user on behalf of the service provider rather than the first identity provider; and
- instructions for sending a response for the request to access the protected resource.

32. The apparatus of claim 31 further comprising:
instructions for triggering the request for the protected resource by a direct request from the user to the service provider.

33. The apparatus of claim 31 further comprising:
instructions for triggering the request for the protected resource by an indirect request from the user to the second identity provider.

34. The apparatus of claim 31 further comprising:
instructions for establishing, prior to receiving the request to access the protected resource, a first alias identifier for the user between the first identity provider and the service provider to link the first user account and the third user account.

35. The apparatus of claim 34 further comprising:
instructions for establishing, after receiving the request to access the protected resource and prior to sending the response to the request to access the protected resource, a second alias identifier for the user between the second identity provider and the service provider to link the second user account and the third user account.

36. The apparatus of claim 35 further comprising:
instructions for employing by the service provider the second alias identifier for the user in place of the first alias identifier during federated single-sign-on operations.

37. The apparatus of claim 35 further comprising:
instructions for replacing by the service provider an alias mapping for the user.

38. The apparatus of claim 35 further comprising:
instructions for replacing by the service provider an alias mapping for the user during the federated single-sign-on operation.

39. The apparatus of claim 31 further comprising:
instructions for extracting by the service provider identifying information for the first identity provider from a cookie in order to determine by the service provider to use the first identity provider to perform the federated single-sign-on operation for the user.

40. The apparatus of claim 31 further comprising:
instructions for prompting the user by the service provider to obtain identifying information for the first identity provider in order to determine by the service provider to use the first identity provider to perform the federated single-sign-on operation for the user.

41. The apparatus of claim 31 further comprising:
instructions for modifying, prior to receiving at the service provider the request to access the protected resource, information in the first user account to indicate that operations with respect to the first user account are restricted until the user completes an identity provider migration operation.

42. The apparatus of claim 31 further comprising:
instructions for modifying, after receiving at the service provider the request to access the protected resource and prior to sending by the service provider the response to the request to access the protected resource, information in the first user account to indicate that the user has completed an identity provider migration operation with respect to the service provider.

43. The apparatus of claim 31 further comprising:
instructions for modifying, after receiving at the service provider the request to access the protected resource and prior to sending by the service provider the response to the request to access the protected resource, information in the first user account to indicate that the first user account is deactivated.

44. The apparatus of claim 31 further comprising:
instructions for prompting, after receiving at the service provider the request to access the protected resource and prior to sending by the service provider the response to the request to access the protected resource, the user by the first identity provider to obtain identifying information for the second identity provider in order to determine an identity of the second identity provider to perform the federated single-sign-on operation for the user.

45. The apparatus of claim 31 further comprising:
instructions for prompting, after receiving at the service provider the request to access the protected resource and prior to sending by the service provider the response to the request to access the protected resource, the user by the service provider to obtain identifying information for the second identity provider in order to determine an identity of the second identity provider to perform the federated single-sign-on operation for the user.

* * * * *